(12) United States Patent
Nishimori

(10) Patent No.: US 10,919,365 B2
(45) Date of Patent: Feb. 16, 2021

(54) EXPANSION VALVE DEVICE

(71) Applicant: DENSO CORPORATION, Kariya (JP)

(72) Inventor: Tomoki Nishimori, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 62 days.

(21) Appl. No.: 16/439,796

(22) Filed: Jun. 13, 2019

(65) Prior Publication Data

US 2019/0291541 A1  Sep. 26, 2019

Related U.S. Application Data

(63) Continuation of application No. PCT/JP2017/038662, filed on Oct. 26, 2017.

(30) Foreign Application Priority Data

Dec. 23, 2016 (JP) ................... 2016-250251
Jun. 30, 2017 (JP) ................... 2017-128259

(51) Int. Cl.
*B60H 1/32* (2006.01)

(52) U.S. Cl.
CPC .................. *B60H 1/3229* (2013.01)

(58) Field of Classification Search
CPC . B60H 1/3229; B60H 1/32; F25B 2341/0683; F25B 41/062
See application file for complete search history.

(56) References Cited

U.S. PATENT DOCUMENTS 6,354,509 B1    3/2002 Fukuda et al.
2013/0031925 A1*  2/2013 Tanaka .................. F25B 41/062
                                                                        62/298

FOREIGN PATENT DOCUMENTS

| JP | 2000203251 A |   | 7/2000  |              |
|----|--------------|---|---------|--------------|
| JP | 2001199230 A |   | 7/2001  |              |
| JP | 2002029251 A | * | 1/2002  |              |
| JP | 2002144856 A | * | 5/2002  | ......... B60H 1/00535 |
| JP | 2002301927 A |   | 10/2002 |              |
| JP | 2004237783 A |   | 8/2004  |              |
| JP | 2004345376 A | * | 12/2004 | ............ F25B 41/062 |
| JP | 2009227027 A |   | 10/2009 |              |

* cited by examiner

*Primary Examiner* — Emmanuel E Duke
(74) *Attorney, Agent, or Firm* — Harness, Dickey & Pierce, P.L.C.

(57) ABSTRACT

The present disclosure provides an expansion valve device which is capable of being mounted easily. The expansion valve device includes: an expansion valve body that depressurizes refrigerant; and a casing in which the expansion valve body is housed. The casing includes a tube portion having an opening through which the expansion valve body is able to pass. The tube portion is formed integrally to surround over an entire perimeter of the expansion valve body. The tube portion has: an elastic holding portion formed of an elastic material and holding the expansion valve body by a reaction force due to elastic deformation by surrounding the entire perimeter of the expansion valve body; and a support portion formed of a material having a higher rigidity than the elastic holding portion and supporting the elastic holding portion. At least a part of the support portion is exposed to outside of the casing.

20 Claims, 23 Drawing Sheets

EXPANSION VALVE DEVICE

CROSS REFERENCE TO RELATED APPLICATIONS

The present application is a continuation application of International Patent Application No. PCT/JP2017/038662 filed on Oct. 26, 2017, which designated the United States and claims the benefit of priority from Japanese Patent Application No. 2016-250251 filed on Dec. 23, 2016 and Japanese Patent Application No. 2017-128259 filed on Jun. 30, 2017. The entire disclosures of all of the above applications are incorporated herein by reference.

TECHNICAL FIELD

The disclosure of this specification relates to an expansion valve device.

BACKGROUND ART

Condensation on an expansion valve is suppressed by covering the expansion valve with a heat insulating member. The heat insulating member is attached to the expansion valve installed in an air conditioning case and connected to the pipe.

SUMMARY

According to an aspect of the present disclosure, an expansion valve device is provided outside an air conditioning case in which an evaporator is disposed in an air conditioner for a vehicle, to be connected to a pipe through which a refrigerant flows from or to the evaporator. The expansion valve device includes: an expansion valve body that depressurizes the refrigerant; and a casing in which the expansion valve body is housed. The casing includes a tube portion having an opening through which the expansion valve body is able to pass. The tube portion is integrally formed to surround over an entire perimeter of the expansion valve body. The tube portion has: an elastic holding portion formed of an elastic material and holding the expansion valve body by a reaction force due to elastic deformation by surrounding the entire perimeter of the expansion valve body; and a support portion formed of a material having a higher rigidity than the elastic holding portion and supporting the elastic holding portion. At least a part of the support portion is exposed to outside of the casing.

DETAILED DESCRIPTION

Figure 1:
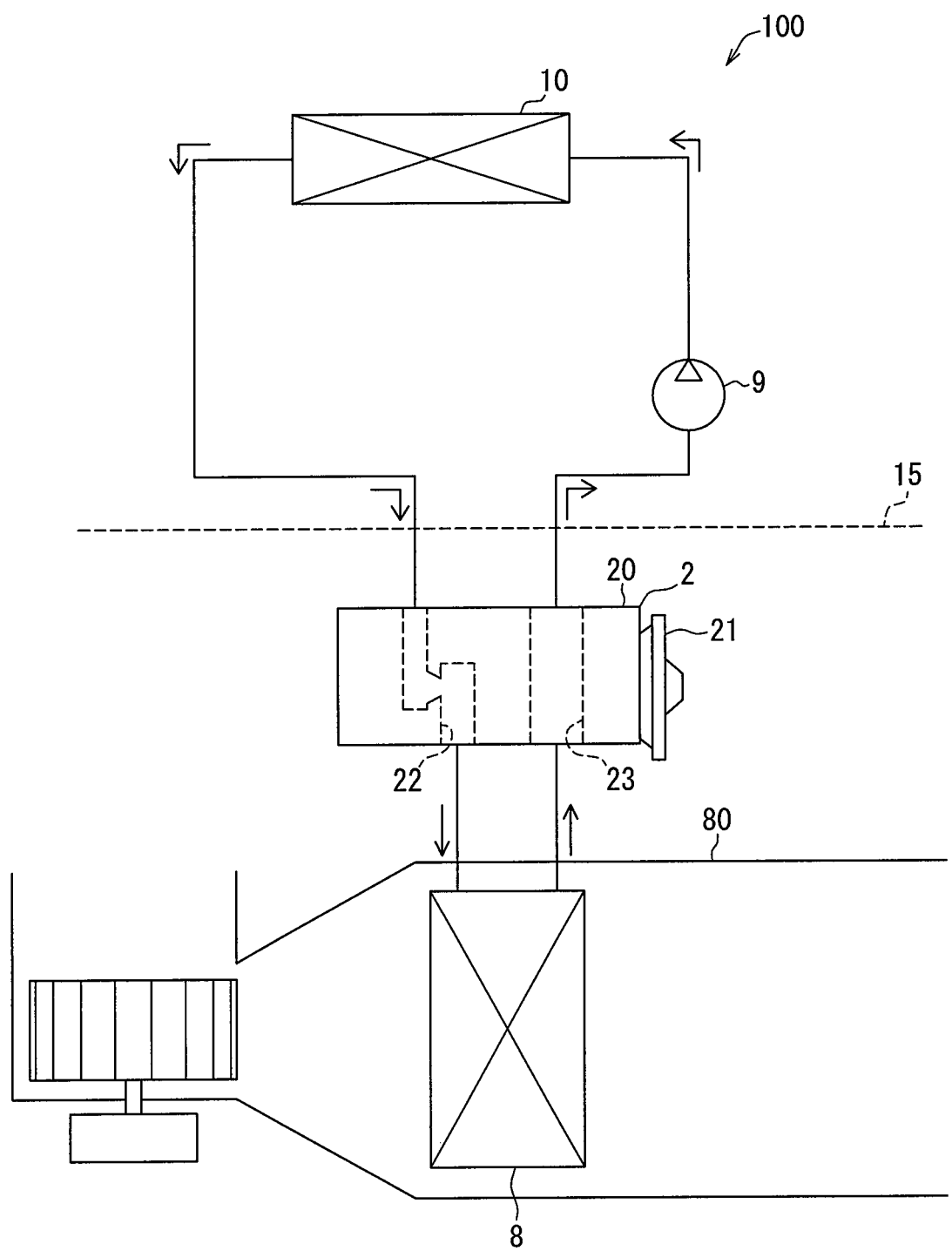
FIG. 1 is a schematic diagram illustrating a refrigeration cycle of an air conditioner for a vehicle.
Figure 2:
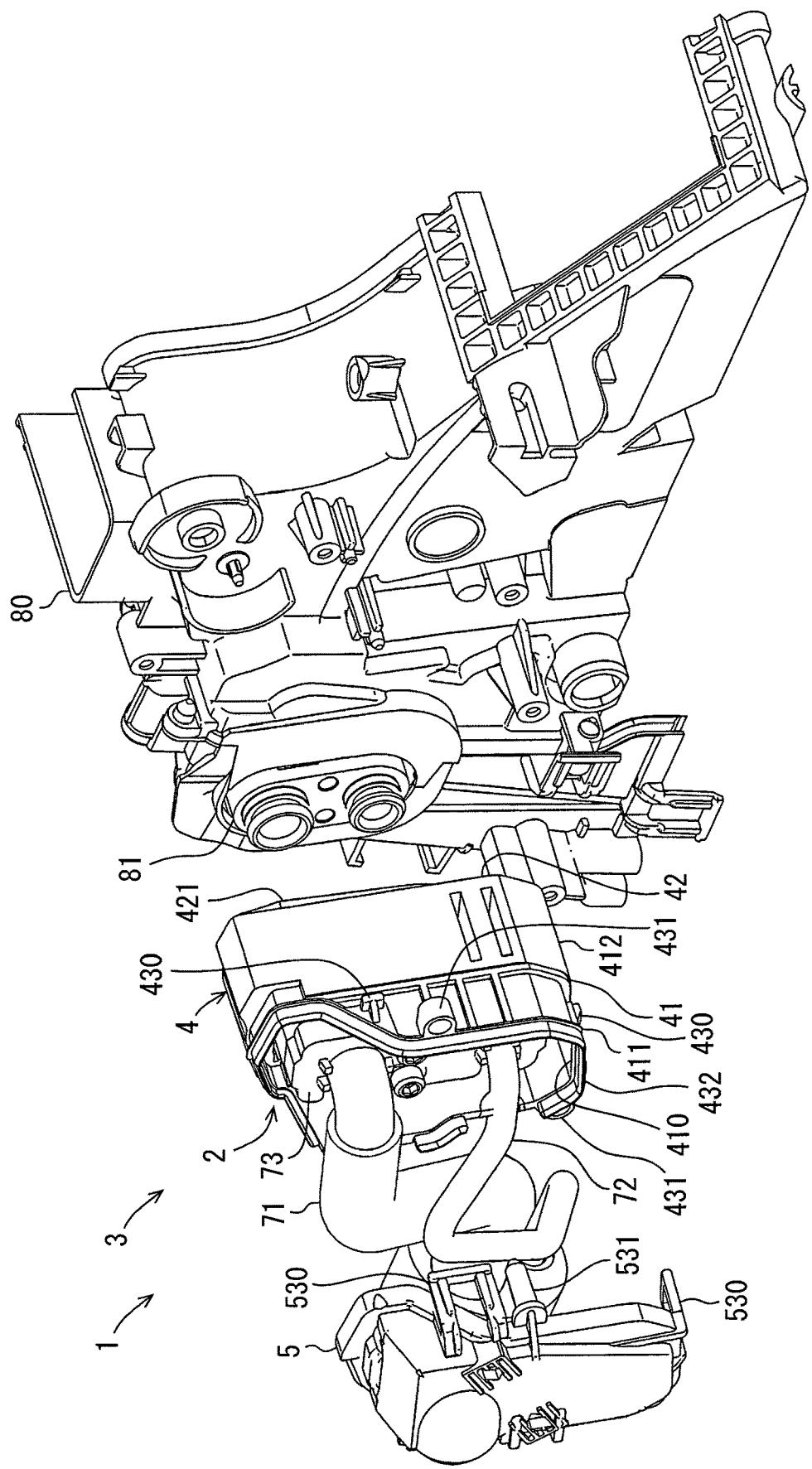
FIG. 2 is an exploded perspective view illustrating the air conditioner including an expansion valve device according to a first embodiment.

To begin with, examples of relevant techniques will be described.

For suppressing condensation on an expansion valve, an expansion valve is covered with a heat insulating member. In this technique, the heat insulating member has a half split shape with a recessed portion for fitting with the expansion valve and a part of a pipe through which refrigerant flows. The heat insulating member is attached to the expansion valve installed in an air conditioning case and connected to the pipe. The expansion valve and the pipe are fitted into the recessed portion due to the half split shape, and then a protruding portion and the recessed portion respectively formed at one end and the other end are engaged with each other, whereby the heat insulating member is mounted on the expansion valve.

The heat insulating member is further assembled after the air conditioning case, the expansion valve, and the pipe are assembled. Therefore, it is necessary to assemble the heat insulating member so as not to interfere with other members such as the air conditioning case or the pipe. The following issues occur when assembling the heat insulating member to the air conditioning case and the pipe after being attached to the expansion valve. That is, since the heat insulating member is formed in a shape including the expansion valve and a part of the pipe, it is difficult to assemble the pipe to the expansion valve in a state where the heat insulating member is assembled to the expansion valve. In addition, it is difficult to put the heat insulating member and the expansion valve in sufficiently close contact with each other, since the heat insulating member is mounted to the expansion valve, due to the engagement between the protruding portion and the recessed portion. When assembling with other members in this state, it is difficult to stably hold the expansion valve to which the heat insulating member is attached. As described above, there is an issue that the assembling is difficult when the assembling is performed in a state where the heat insulating member is attached to the expansion valve.

The present disclosure provides an expansion valve device capable of improving the assembling property. The disclosed aspects in this specification adopt different technical solutions from each other in order to achieve their respective objectives. In addition, the technical scope is not limited by the reference numerals.

According to an aspect of the present disclosure, an expansion valve device is provided outside an air conditioning case in which an evaporator is disposed in an air conditioner for a vehicle, to be connected to a pipe through which a refrigerant flows from or to the evaporator. The expansion valve device includes: an expansion valve body that depressurizes the refrigerant; and a casing in which the expansion valve body is housed. The casing includes a tube portion having an opening through which the expansion valve body is able to pass. The tube portion is integrally formed to surround over an entire perimeter of the expansion valve body. The tube portion has: an elastic holding portion formed of an elastic material and holding the expansion valve body by a reaction force due to elastic deformation by surrounding the entire perimeter of the expansion valve body; and a support portion formed of a material having a higher rigidity than the elastic holding portion and supporting the elastic holding portion. At least a part of the support portion is exposed to outside of the casing.

According to this disclosure, the elastic holding portion of the casing holds the expansion valve body without supporting the pipe. Therefore, the pipe can be connected in a state where the expansion valve body is housed in the casing. In addition, the elastic holding portion of the casing holds the expansion valve body by the integrally-formed tube portion. Therefore, it is possible to assemble the expansion valve device in a state where the elastic holding portion and the expansion valve body are sufficiently in close contact with each other. Furthermore, since it is possible to hold the rigid part of the support portion exposed to the outside during the assembling time, the assembling can be stably. performed. As described above, it is possible to provide an expansion valve device capable of improving the assembling property.

In another aspect of the present disclosure, an expansion valve device is provided outside an air conditioning case in which an evaporator is disposed in an air conditioner for a vehicle, to be connected to a pipe through which a refrigerant flows from or to the evaporator. The expansion valve device includes: an expansion valve body that depressurizes the refrigerant; and a casing in which the expansion valve body is housed. The casing includes: a tube portion having an opening through which the expansion valve body is able to pass, the tube portion being integrally formed to surround over an entire perimeter of the expansion valve body; and a seal portion that blocks a flow of air between inside and outside of the casing at a place connected to the evaporator. The tube portion has: an elastic holding portion formed of an elastic material and holding the expansion valve body by a reaction force due to elastic deformation; and a support portion formed of a material having a higher rigidity than the elastic holding portion to surround the entire periphery of the expansion valve body and supporting the elastic holding portion. At least a part of the support portion is exposed to outside of the casing.

According to this disclosure, the casing holds the expansion valve body by the elastic holding portion without supporting the piping. Therefore, the piping can be connected in a state where the expansion valve body is housed in the casing. Further, the casing holds the expansion valve body by the elastic holding portion of the integrally-formed tube portion. Therefore, it is possible to assemble the elastic holding portion and the expansion valve body in a state where the elastic holding portion and the expansion valve body are sufficiently in close contact with each other. Furthermore, since it is possible to hold the rigid part of the support portion exposed to the outside during the assembling, the assembling can be performed stably. As described above, it is possible to provide an expansion valve device capable of improving the assembling property.

First Embodiment

An expansion valve device 1 according to a first embodiment will be described with reference to FIGS. 1 to 9. The expansion valve device 1 is applied to an air conditioner for a vehicle. The air conditioner includes an air conditioning unit and a blowing unit for blowing air to the air conditioning unit. The air conditioning unit includes: air conditioning components for conditioning air blown from the blowing unit; and an air conditioning case 80 for housing the air conditioning components. The air conditioning components are an evaporator 8, a heater core, an air mixing door, and the like. The air conditioning unit and the blowing unit are installed in a space between the instrument panel and a dash panel 15. The dash panel 15 is a partition plate separating the engine room and the vehicle cabin from each other. For example, the air conditioning unit and the blowing unit are arranged side by side in the width direction of the vehicle.

The expansion valve device 1 includes: an expansion valve body 2 functioning as a decompression device in the refrigeration cycle 100 of the vehicle; and a casing 3 housing the expansion valve body 2. As shown in FIG. 1, the refrigeration cycle 100 is a vapor compression type refrigeration cycle having at least a condenser 10, the expansion valve body 2, the evaporator 8 and a compressor 9 as refrigeration cycle parts. In the refrigeration cycle 100, functional components are annularly connected by piping or the like so that the refrigerant can be circulated. Among the refrigeration cycle parts, the condenser 10 and the compressor 9 are disposed in the engine room. The expansion valve body 2 and the evaporator 8 are disposed in the vehicle cabin.

The expansion valve body 2 is a pressure reducing device for reducing the pressure of the refrigerant flowing into the evaporator 8 in the refrigeration cycle 100. The expansion valve body 2 is a temperature-sensitive expansion valve that adjusts the throttle opening degree, for example, according to the temperature of the refrigerant flowing out from the evaporator 8. The expansion valve body 2 has a body portion 20, and a diaphragm portion 21 provided on the body portion 20. For example, the body portion 20 has an inflow passage 22 through which the refrigerant flows into the evaporator 8, an orifice formed in the inflow passage 22, and an outflow passage 23 through which the refrigerant flows from the evaporator 8. The expansion valve body 2 is a so-called box type expansion valve. Since the inflow passage 22 depressurizes the refrigerant flowing therethrough, the inflow passage 22 can also be referred to as a pressure reduction passage. In the following description, the diaphragm portion 21 is located on an upper side of the expansion valve body 2, and the opposite side of the diaphragm portion 21 is defined as a lower side. That is, the diaphragm portion 21 is provided at the upper end of the body portion 20. The expansion valve body 2 includes a valve member, an operating rod, and the diaphragm portion 21. The valve member is capable of adjusting the throttle opening degree of the throttle portion. The operating rod is disposed in the outflow passage 23, and is capable of operating the valve member. The diaphragm portion 21 is connected to an end portion of the operating rod. A pressure chamber is provided inside the diaphragm portion 21. The temperature of the refrigerant in the outflow passage 23 is transmitted to the operating rod. When the pressure changes according to the temperature, the operating rod moves to adjust the throttle opening by the valve member. The expansion valve body 2 is attached to the air conditioner for a vehicle.

The body portion 20 of the expansion valve body 2 has a pipe connection surface 25 and an evaporator connection surface 26 opposite to the pipe connection surface 25. The pipe is connected the pipe connection surface 25 having an inlet opening of the inflow passage 22 and an outlet opening of the outflow passage 23. The evaporator connection surface 26 is connected to a joint portion 81. The pipes 71, 72 are connected to the pipe connection surface 25 by inserting the pipes 71, 72 respectively into the inlet opening of the inflow passage 22 and the outlet opening of the outflow passage 23. The evaporator connection surface 26 is connected to the joint portion 81. A part of the joint portion 81 is inserted into the outlet opening of the inflow passage 22 and the inlet opening of the outflow passage 23. The body portion 20 is made of metal, for example. The expansion valve body 2 is attached to the evaporator 8 and fixed to the air conditioner.

Figure 3:
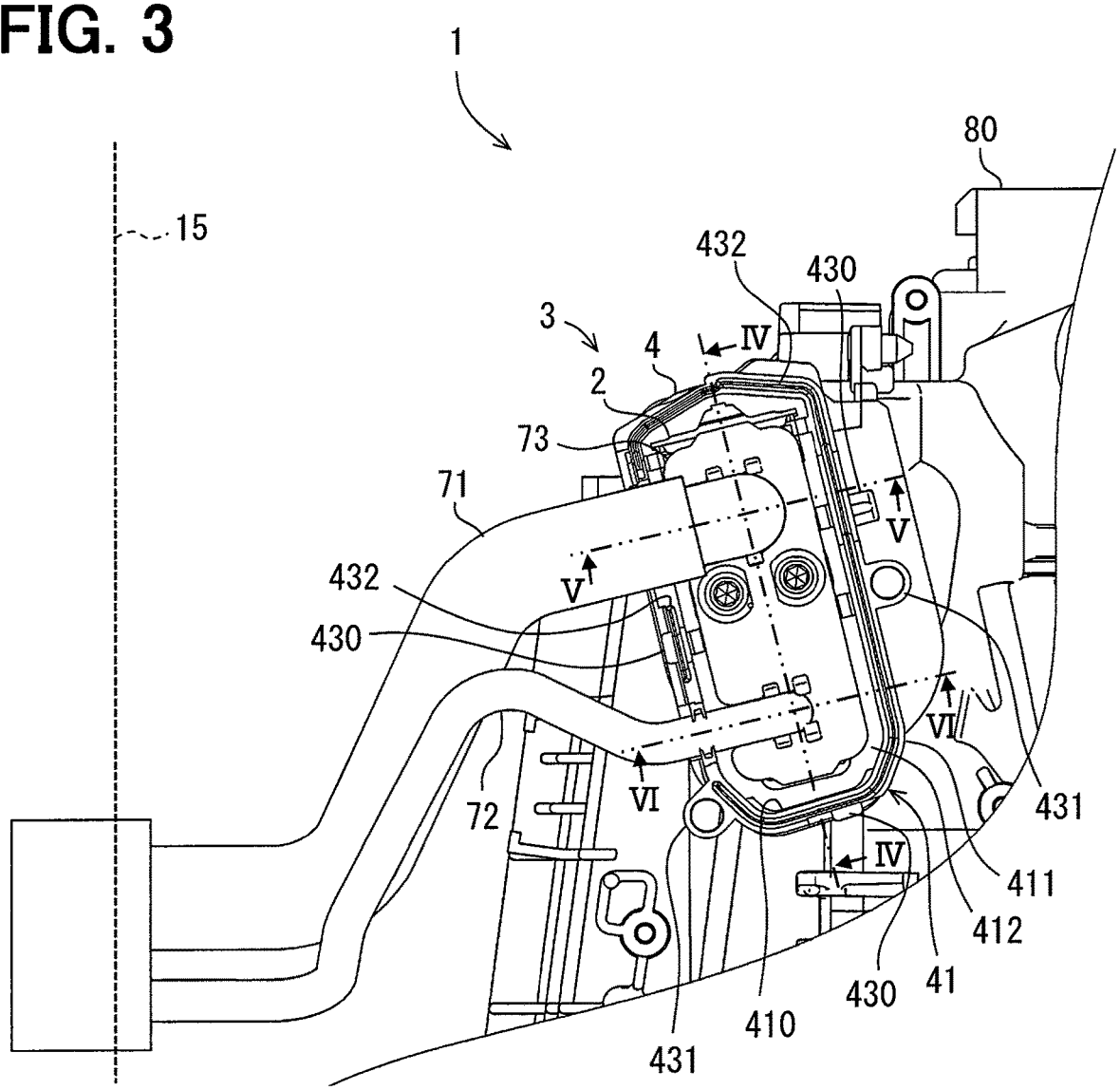
FIG. 3 is a view illustrating the expansion valve device of the first embodiment that is assembled to the air conditioner.

As shown in FIGS. 2 to 6, the expansion valve body 2 is provided outside the air conditioning case 80. The expansion valve body 2 is provided, for example, on the outer surface of the air conditioning case 80 facing the air blowing unit. In other words, the expansion valve body 2 is provided close to the air blowing unit in the air conditioning unit. The air conditioning case 80 houses the evaporator 8, and has an opening through which the joint portion 81 of the evaporator protrudes outward of the air conditioning case 80. The joint portion 81 is a joint member provided at an end portion of the evaporator 8, and integrally has an inlet portion and an outlet portion of the evaporator 8. The expansion valve body 2 is installed to the air conditioning case 80 by being connected to and fixed to the joint portion 81. The expansion valve body 2 is attached to the air conditioning case 80 in a state where the expansion valve body 2 is housed in the casing 3. As shown in FIG. 3, the entire expansion valve device 1 is installed in the vehicle cabin separated from the engine room by the dash panel 15.

Two pipes are connected to the expansion valve body 2. Specifically, the high pressure pipe 72 is connected to the inlet opening of the inflow passage 22, and the low pressure pipe 71 is connected to the outlet opening of the outflow passage 23. The high pressure refrigerant compressed by the compressor 9 and passing through the condenser 10 flows through the high pressure pipe 72. The low pressure refrigerant depressurized by the expansion valve body 2 and discharged from the evaporator 8 flows through the low pressure pipe 71. The low pressure pipe 71 and the high pressure pipe 72 are connected to the expansion valve body 2 as one unit integrally formed by a connection block 73.

Each of the pipes 71, 72 extends from the expansion valve body 2 and is bent immediately after the expansion valve body 2, and further extends toward the dash panel 15 so as not to interfere with the blowing unit arranged on the side of the air conditioning unit.

As described above, the refrigerant circulates inside the expansion valve body 2. Therefore, the expansion valve body 2 is cooled by the refrigerant when the refrigeration cycle 100 is operating. If the surface of the expansion valve body 2 is exposed to the outside of the air conditioning case 80, dew condensation occurs on the surface of the cooled expansion valve body 2 and may drip into the vehicle cabin.

In order to suppress the dew condensation, it is conceivable to thermally insulate the expansion valve body 2 by winding a rubber member such as packing around the expansion valve. However, it is necessary to wind the rubber member to be brought into close contact with the whole of the expansion valve body 2 in order to sufficiently prevent the dew condensation, and this winding operation becomes complicated. The expansion valve device 1 of the first embodiment has a configuration capable of thermally insulate the expansion valve body 2 without carrying out such complicated work as described above. The configuration will be described below.

The casing 3 houses the expansion valve body 2. The casing 3 includes a housing portion 4 and a cover portion 5. The housing portion 4 is a tubular member housing and holding the expansion valve body 2 therein. The cover portion 5 is fitted to the housing portion 4. The casing 3 houses the expansion valve body 2, and a part of the high pressure pipe 72 and the low pressure pipe 71 connected to the expansion valve body 2. The casing 3 functions as a heat insulating case for suppressing the transmission of heat between the expansion valve body 2 and the outside by covering the expansion valve body 2 to suppress the dew condensation on the expansion valve body 2.

The housing portion 4 is a tubular body having a tube portion 41 and a bottom portion 42. The tube portion 41 extends from one of the connection surfaces 25, 26 of the expansion valve body 2 to the other. The bottom portion 42 is provided at an end of the tube portion 41 adjacent to the evaporator connection surface 26, and has a bottom opening 420. The housing portion 4 is a two-color molded part made of two different materials. The two different materials are an elastic material having elasticity and another material which is less deformed by external force than the elastic material. The another material is a material having higher rigidity than the elastic material. In other words, the another material is harder than the elastic material.

Hereinafter, the another material which is less likely to be deformed by an external force than the elastic material is sometimes referred to as a hard material. Conversely, the elastic material is a material that is more easily deformed than the hard material, and is softer than the hard material. Hereinafter, the elastic material may be referred to as a soft material in contrast to a hard material. The soft material may be an elastomer which is a resin having rubber elasticity, such as butyl rubber, olefinic thermoplastic elastomer or the like. Alternatively, a resin having elasticity may be used other than elastomer. It is desirable that the soft material has better heat insulating performance than the hard material. The hard material may be, for example, resin material such as polypropylene or the like. The housing portion 4 is a cylindrical body formed integrally by molding the hard material and the soft material in two colors.

The tube portion 41 is formed to surround the entire periphery of the expansion valve body 2. Since the housing portion 4 is formed as an integral part, the tube portion 41 is formed integrally over the entire perimeter surrounding the expansion valve body 2. Here, "being formed integrally over the entire perimeter" means that the tube portion 41 has a tubular shape which is seamlessly continued in the circumferential direction. An end of the tube portion 41 opposite to the bottom portion 42, that is, adjacent to the pipe connection surface 25, has the opening 410. The opening 410 is formed so that the expansion valve body 2 can pass through. The opening 410 is a passage opening through which the expansion valve body 2 passes when the expansion valve body 2 is assembled into the casing 3.

The tube portion 41 has an elastic holding portion 412 and a support portion 411. The elastic holding portion 412 is formed of a soft material that holds the expansion valve body 2. The support portion 411 is formed of a hard material, and at least a part of the support portion 411 is exposed to the outside. The tube portion 41 has an external shape formed by a single tubular shape by coupling a tube part formed by the elastic holding portion 412 and a tube part 411a formed by the support portion 411.

The elastic holding portion 412 is formed in, for example, a cylindrical shape that surrounds the entire perimeter of the expansion valve body 2. The elastic holding portion 412 has a contact surface in contact with the expansion valve body 2. The contact surface has a corresponding shape along the outer peripheral surface of the expansion valve body 2. That is, the contact surface forms a contour similar in shape to the corresponding portion of the expansion valve body 2 in a state where the expansion valve body 2 is not held. This contour is slightly smaller than the outer dimension of the expansion valve body 2. Therefore, when the expansion valve body 2 is housed and the contact surface is in contact with the expansion valve body 2, the elastic holding portion 412 is compressed by the expansion valve body 2. The compressed state can also be expressed as an elastically deformed state. The elastic holding portion 412 causes the reaction force against this elastic deformation to act on the expansion valve body 2. The elastic holding portion 412 can hold the expansion valve body 2 by this reaction force. In other words, the elastic holding portion 412 is formed to have a thickness capable of holding the expansion valve body 2 by elastic deformation.

Figure 7:
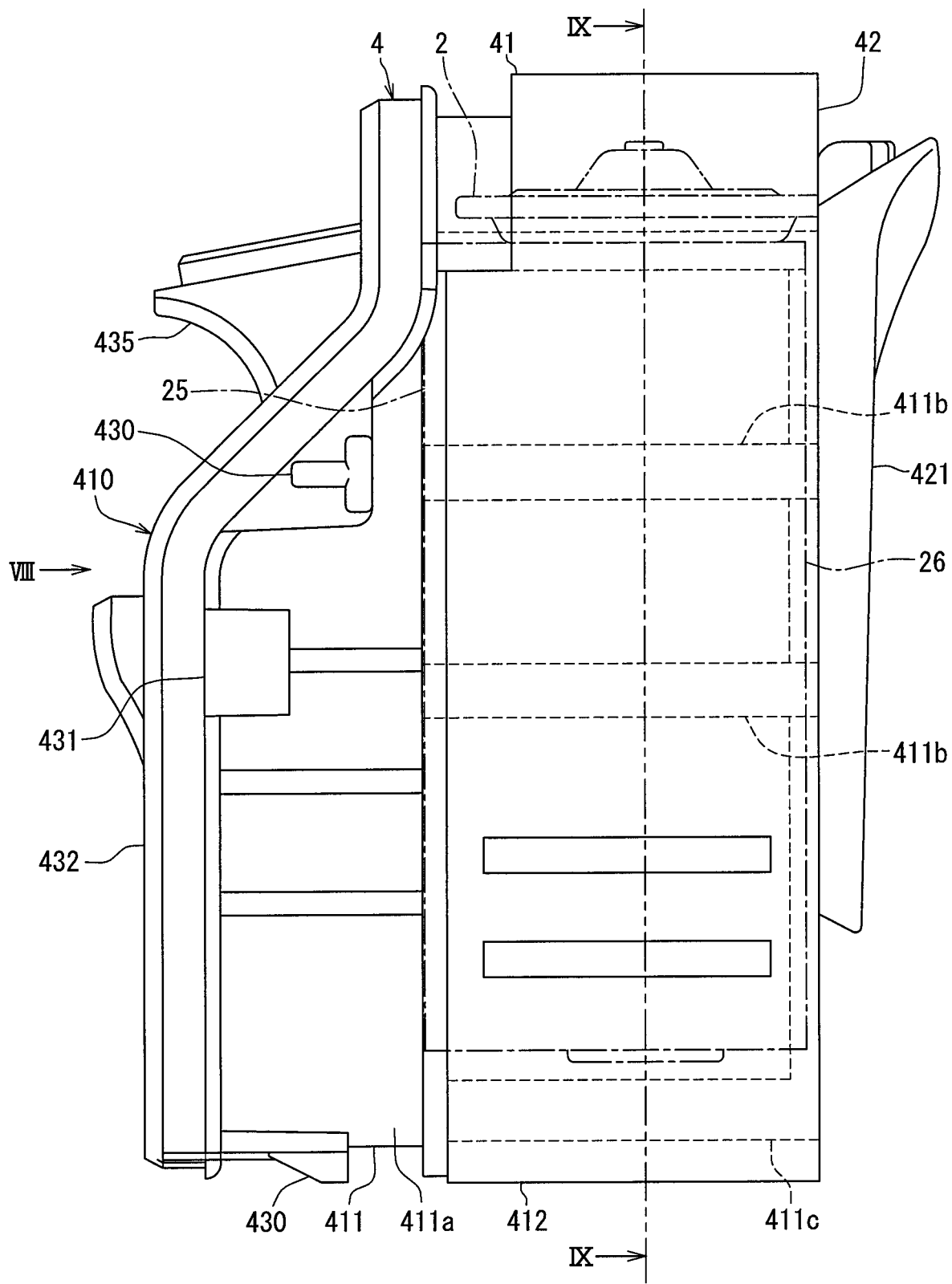
FIG. 7 is a side view illustrating the expansion valve device of the first embodiment.
Figure 8:
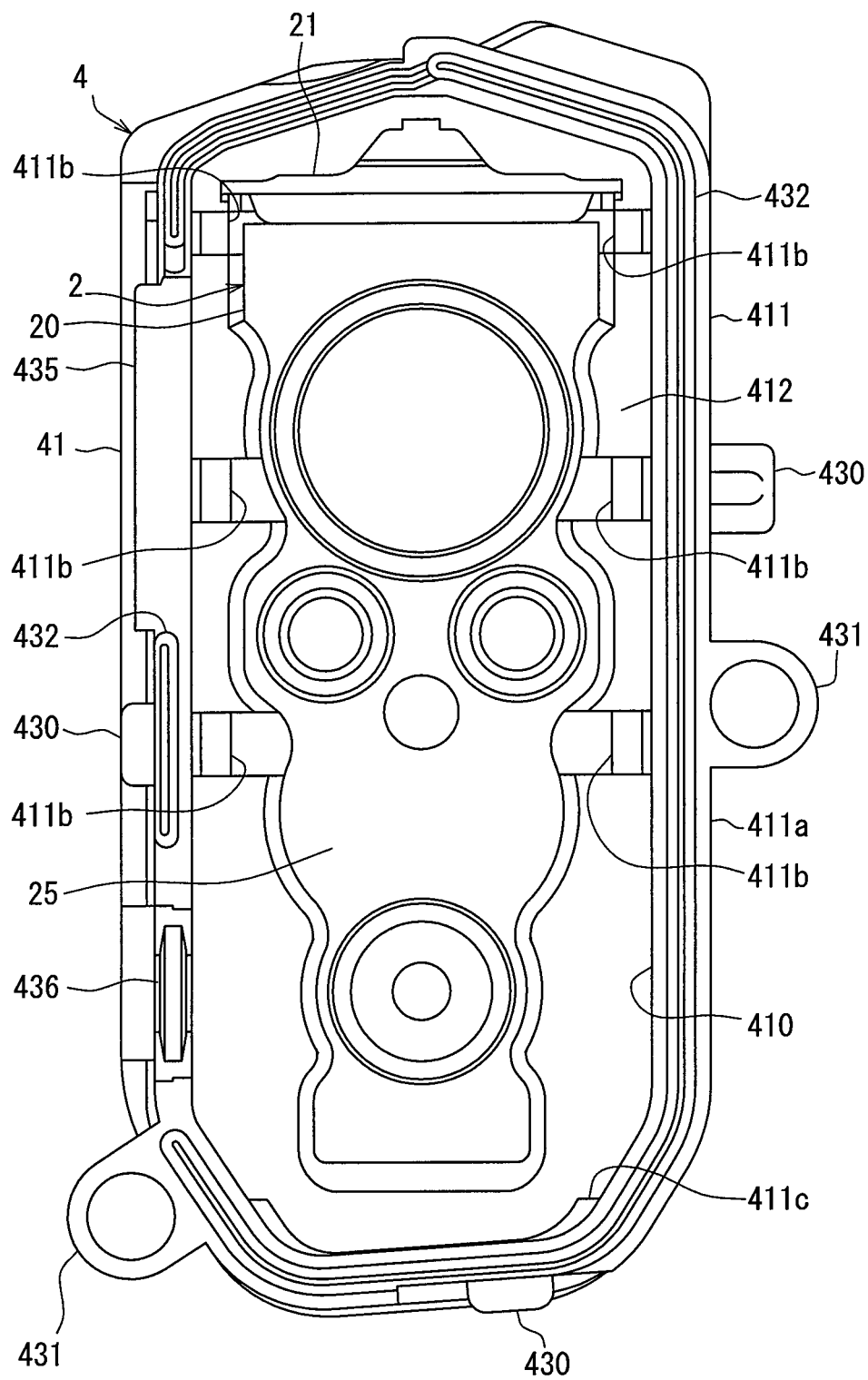
FIG. 8 is a view seen from an arrow direction VIII in FIG. 7.
Figure 9:
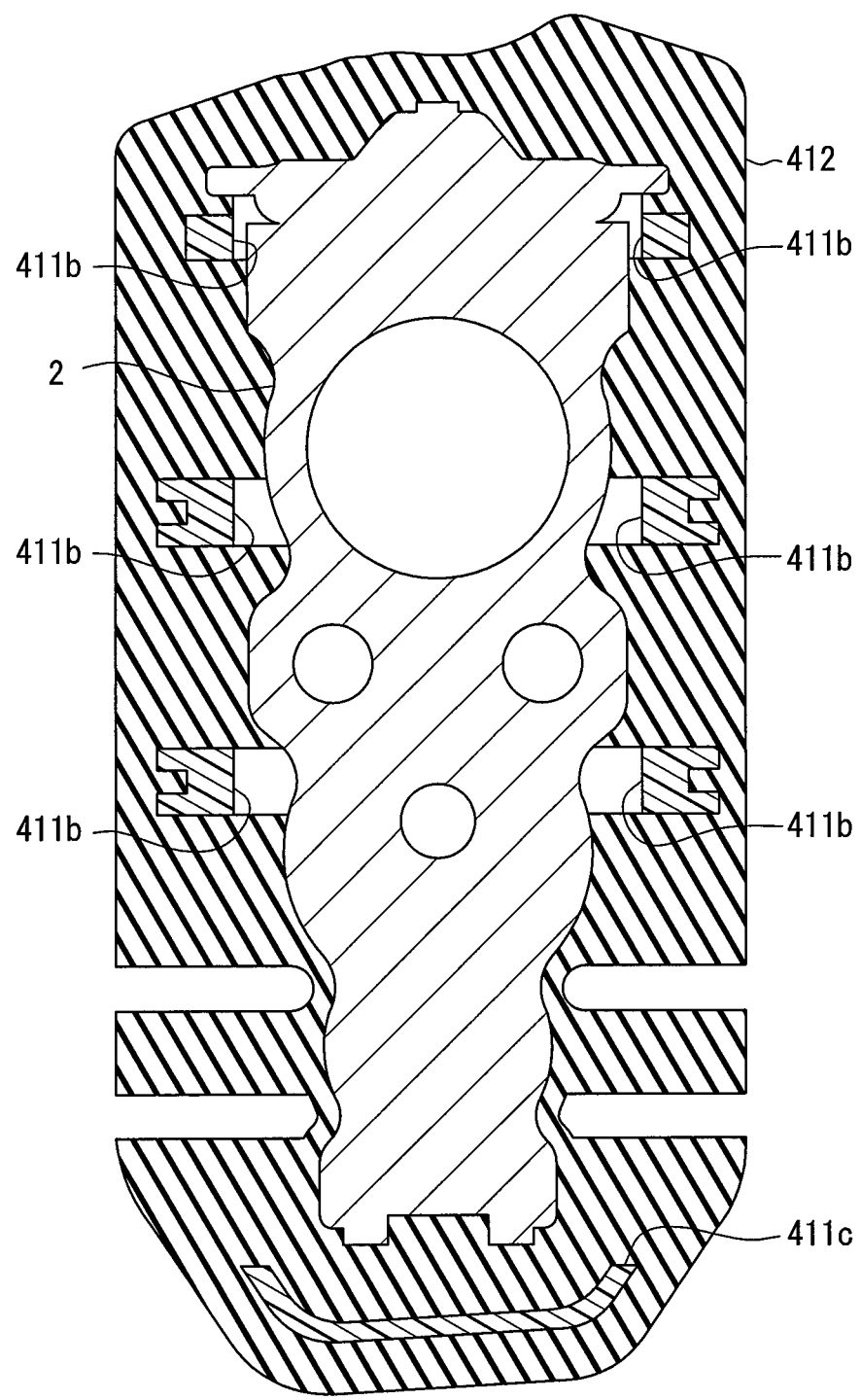
FIG. 9 is a cross-sectional view taken along a line IX-IX of FIG. 7.

As shown in FIGS. 7 to 9, the elastic holding portion 412 is a covering member that covers and surrounds the entire perimeter of the expansion valve body 2 not to be exposed to the outside. In other words, the elastic holding portion 412 surrounds the surface of the expansion valve body 2 connecting the evaporator connection surface 26 and the pipe connection surface 25. FIG. 7 is a side view of the housing portion 4 in which the expansion valve body 2, the side frame 411b, and the lower frame 411c are perspective. In FIG. 7, the expansion valve body 2 is indicated by a single chain line, and the side frame 411b and the lower frame 411c are indicated by a dashed line. The elastic holding portion 412 insulates the expansion valve body 2 by covering the expansion valve body 2. The elastic holding portion 412 is formed of a soft material having better heat insulating performance than the hard material forming the support portion 411. Therefore, it is possible to ensure the heat insulating performance, to prevent the dew condensation on the expansion valve device 1 by surrounding the entire periphery of the expansion valve body 2 with the elastic holding portion 412.

Further, in the expansion valve device 1, the entire perimeter of the expansion valve body 2 is surrounded with the elastic holding portion 412 formed of a soft material.

Therefore, the area of the elastic holding portion 412 which is in close contact with the expansion valve body 2 is made larger. That is, it is possible to form the casing 3 having a smaller space between the tube portion 41 and the expansion valve body 2. This makes it possible to further reduce the amount of air contained in the casing 3, and consequently the amount of water vapor, to ensure the performance of preventing the dew condensation also from this point.

The elastic holding portion 412 suppresses vibration of the expansion valve body 2. The expansion valve body 2 vibrates while the refrigerant passes through the inside thereof. When this vibration is transmitted to the vehicle cabin via the pipe 71, 72, the evaporator 8, the air conditioning case 80, etc., noise and vibration are generated in the vehicle cabin. The elastic holding portion 412 suppresses the vibration of the expansion valve body 2 by the mass of the entire casing 3 including the elastic holding portion 412. The mass of the elastic holding portion 412 is set suitably for suppressing the vibration of the expansion valve body 2. The mass of the elastic holding portion 412 is set suitably for suppressing the vibration of the expansion valve body 2 according to its shape and selection of a soft material.

The elastic holding portion 412 is provided in contact with the diaphragm portion 21 and a part of the body portion 20 surrounding the outflow passage 23. The part of the body portion 20 surrounding the outflow passage 23 is, for example, a part of the body portion 20 corresponding to the region between the upper end and the lower end of the outflow passage 23. The vibration is increased particularly at the diaphragm portion 21 and the part of the body portion 20 surrounding the outflow passage 23 when the refrigerant passes. Therefore, it is possible to effectively suppress the vibration by holding the expansion valve body 2 due to the contact with the elastic holding portion 412.

As shown in FIG. 4 and FIGS. 7 to 9, the support portion 411 has a tube part 411a, a side frame 411b extending from the tube part 411a toward the bottom portion 42, and a lower frame 411c. The support portion 411 supports the elastic holding portion 412. The tube part 411a is a part of the support portion 411 exposed to the outside of the housing portion 4. The tube part 411a is an opening forming member which forms the opening 410 in the housing portion 4. The tube part 411a has a projecting portion 430 for engaging with the cover portion 5 to fix the cover portion 5. The projecting portion 430 is projected outward from the housing portion 4. The tube part 411a has a positioning hole portion 431 for defining the position of the cover portion 5 with respect to the housing portion 4.

The side frame 411b extends on both sides of the expansion valve body. The side frame 411b is provided in the elastic holding portion 412. That is, the side frame 411b is covered with the elastic holding portion 412 and not exposed to the outside. The side frame 411b is one of a plurality of side frames. The side frame 411b supports the elastic holding portion 412. The side frame 411b is provided between the expansion valve body 2 and the elastic holding portion 412. The side frame 411b is distanced from the expansion valve body 2, and the side frame 411b is formed integrally with the elastic holding portion 412. In other words, the elastic holding portion 412 is defined by the inner surface of the tube part formed by the elastic holding portion 412.

The lower frame 411c extends to cover the lower surface of the expansion valve body 2. The lower frame 411c connects the tube part 411a and the bottom portion 42. The lower frame 411c is provided inside the elastic holding portion 412. That is, the lower frame 411c is covered with the elastic holding portion 412 and not exposed to the outside. The lower frame 411c is provided to penetrate the elastic holding portion 412. The side frame 411b and the lower frame 411c are reinforcing members that increase the strength of the housing portion 4. The side frame 411b and the lower frame 411c enhance the tight contact between the elastic holding portion 412 and the expansion valve body 2 by supporting the elastic holding portion 412.

The expansion valve body 2 is press-fitted into the elastic holding portion 412, and thereby held in the housing portion 4. The expansion valve body 2 enters the housing portion 4 from the opening 410, and is press-fitted into the elastic holding portion 412 by passing through the tube part 411a. In the case of the expansion valve device 1 of the first embodiment, among the two connection surfaces 25, 26 of the expansion valve body, the evaporator connection surface 26 firstly passes through the opening 410 to be housed in the housing portion 4. The expansion valve body 2 is press-fitted into the elastic holding portion 412 until the evaporator connection surface 26 contacts the bottom portion 42. As a result, the expansion valve body 2 is housed in the housing portion 4 as shown in FIG. 8.

Figure 4:
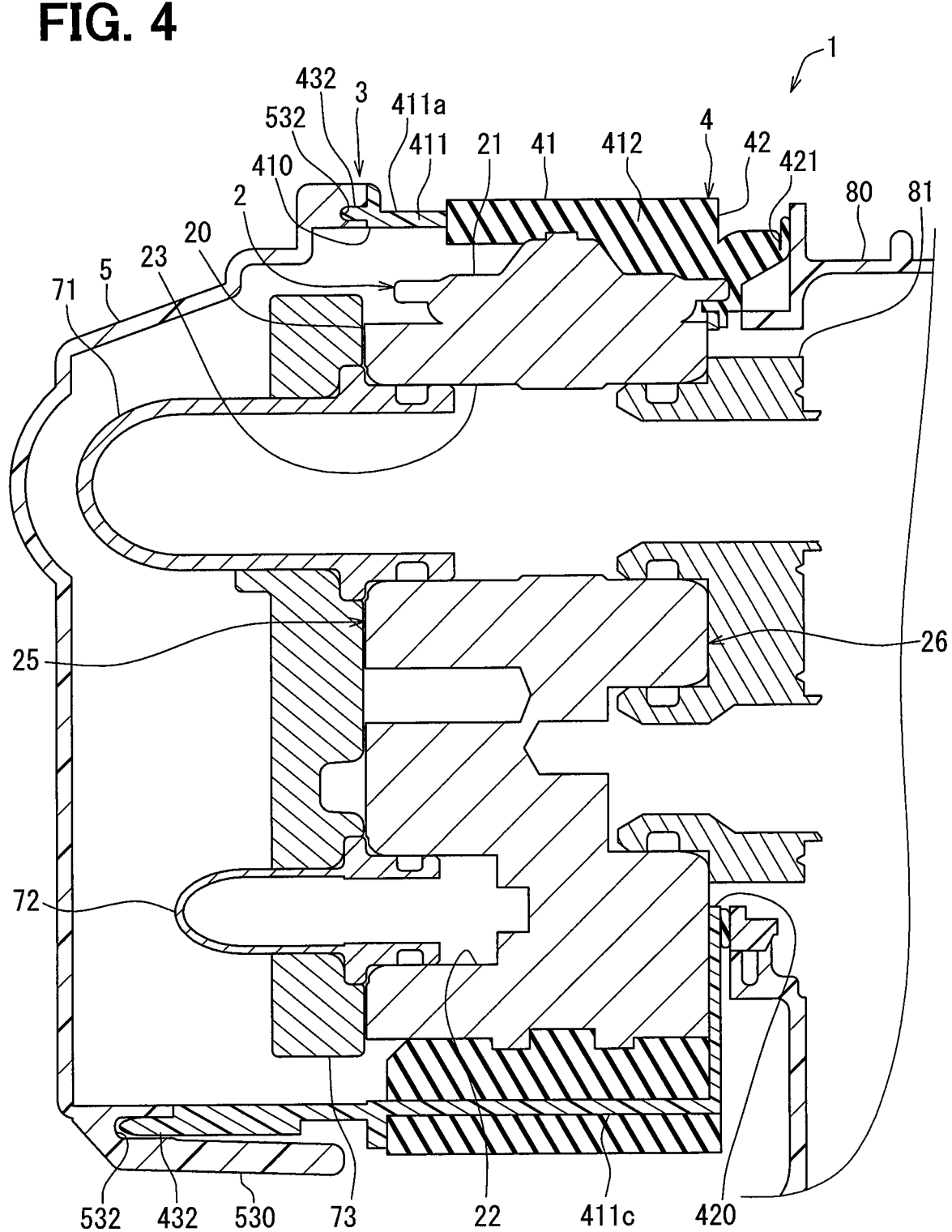
FIG. 4 is a cross-sectional view taken along a line IV-IV of FIG. 3.

The bottom portion 42 of the housing portion 4 is in contact with a part of the evaporator connection surface 26 of the expansion valve body 2, and regulates the movement of the expansion valve body 2 in a direction from the opening 410 to the bottom portion 42. A bottom opening 420 is formed in the bottom portion 42 of the housing portion 4. The joint portion 81 of the evaporator 8 passes through the bottom opening 420. That is, the bottom opening 420 is an opening for connection with the evaporator 8. A seal portion 421 is formed on the bottom portion 42. The seal portion 421 is formed to surround the bottom opening 420 all around. The seal portion 421 is formed of a soft material. As shown in FIG. 4, when the expansion valve device 1 is attached to the air conditioning case 80, the seal portion 421 is in close contact with the air conditioning case 80 over the entire perimeter. Therefore, the seal portion 421 seals the gap between the casing 3 and the air conditioning case 80.

The cover portion 5 is a lid member fitted with the housing portion 4 to close the opening 410 of the housing portion 4. The cover portion 5 is an integrally molded product molded integrally as a whole. That is, the cover portion 5 is engaged with the housing portion 4 to close the opening 410 with only one member. Like the housing portion 4, the cover portion 5 is a two-color molded product made of a hard material and a soft material. The hard material and the soft material are the same material as the hard material and the soft material of the housing portion 4. Alternatively, the cover portion 5 may be formed of a hard material and a soft material different from the housing portion 4. The cover portion 5 has a groove 532 fitted with a protrusion 432 of the housing portion 4. The hermeticity of the casing 3 is improved by the fitting structure of the groove 532 and the protrusion 432. The cover portion 5 may have a protrusion, and the housing portion 4 may have a groove. Instead of the groove 532 and the protrusion 432, the hermeticity of the cover portion 5 and the housing portion 4 may be enhanced by close contact between a portion formed of a soft material and a portion formed of a hard material, or by close contact between portions formed of a soft material.

The cover portion 5 has plural engaging portions 530 engaged with a projecting portion 430 of the housing portion 4. The engaging portion 530 has a locking hole through which the projecting portion 430 is inserted, and is engaged by being caught by the projecting portion 430. Therefore, the cover portion 5 can be easily fitted and attached to the housing portion 4. It is to be noted that a projecting portion may be provided on the cover portion 5 and an engaging portion may be provided on the housing portion 4. Further, the cover portion 5 may be attached to the housing portion 4 by a fastening member such as screw or bolt. The cover portion 5 has a positioning portion 531 that regulates the position of the cover portion 5 with respect to the housing portion 4. The positioning portion 531 is formed, for example, as a rod-shaped projecting portion that is inserted into the positioning hole portion 431 of the housing.

Figure 5:
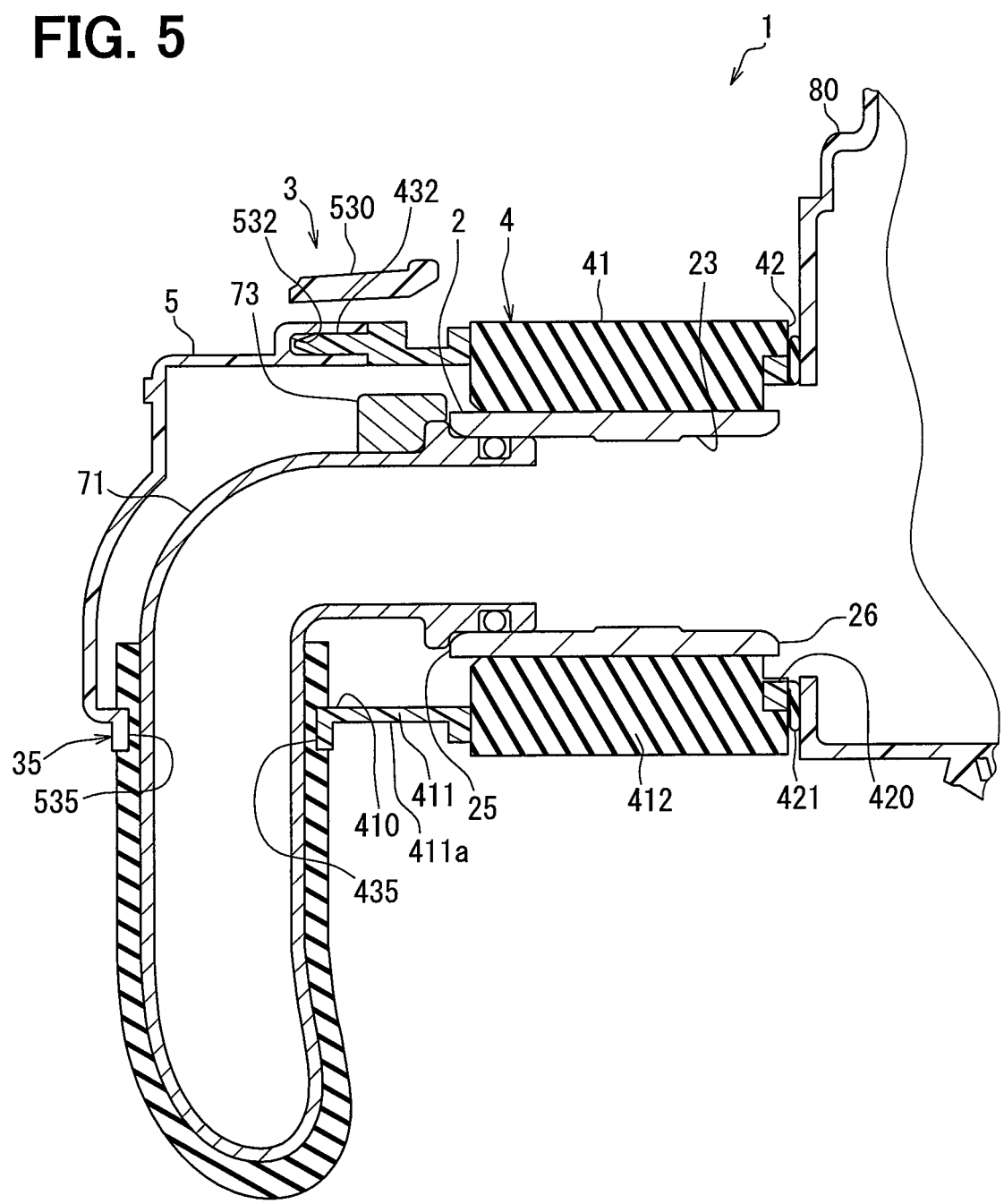
FIG. 5 is a cross-sectional view taken along a line V-V of FIG. 3.

The casing 3 has a low pressure pipe seal portion 35 where the low pressure pipe 71 is interposed between the end of the cover portion 5 and the end of the housing portion 4 for sealing. As shown in FIG. 5, the low pressure pipe seal portion 35 includes: a contact end portion 535 in contact with the low pressure pipe 71 at the end of the cover portion 5; and a contact end portion 435 in contact with the low pressure pipe 71 at the end of the housing portion 4. The contact end portion 435, 535 is formed in a semicircular shape. Both of the contact end portions 435, 535 are formed of a hard material. The contact end portions 435, 535 form a circular opening in a state where the cover portion 5 and the housing portion 4 are fitted. This opening is formed to have the inner diameter smaller than the outer diameter of the low pressure pipe 71 to which the insulator is attached. That is, when the cover portion 5 and the housing portion 4 are fitted together, the insulator of the low pressure pipe 71 is compressed over the entire perimeter by the contact end portions 435, 535 formed of a hard material. Therefore, the contact end portions 435, 535 are brought into close contact with the insulator of the low pressure pipe 71 around the entire perimeter. As a result, the low pressure pipe seal portion 35 seals the gap between the low pressure pipe 71 and the casing 3.

Figure 6:
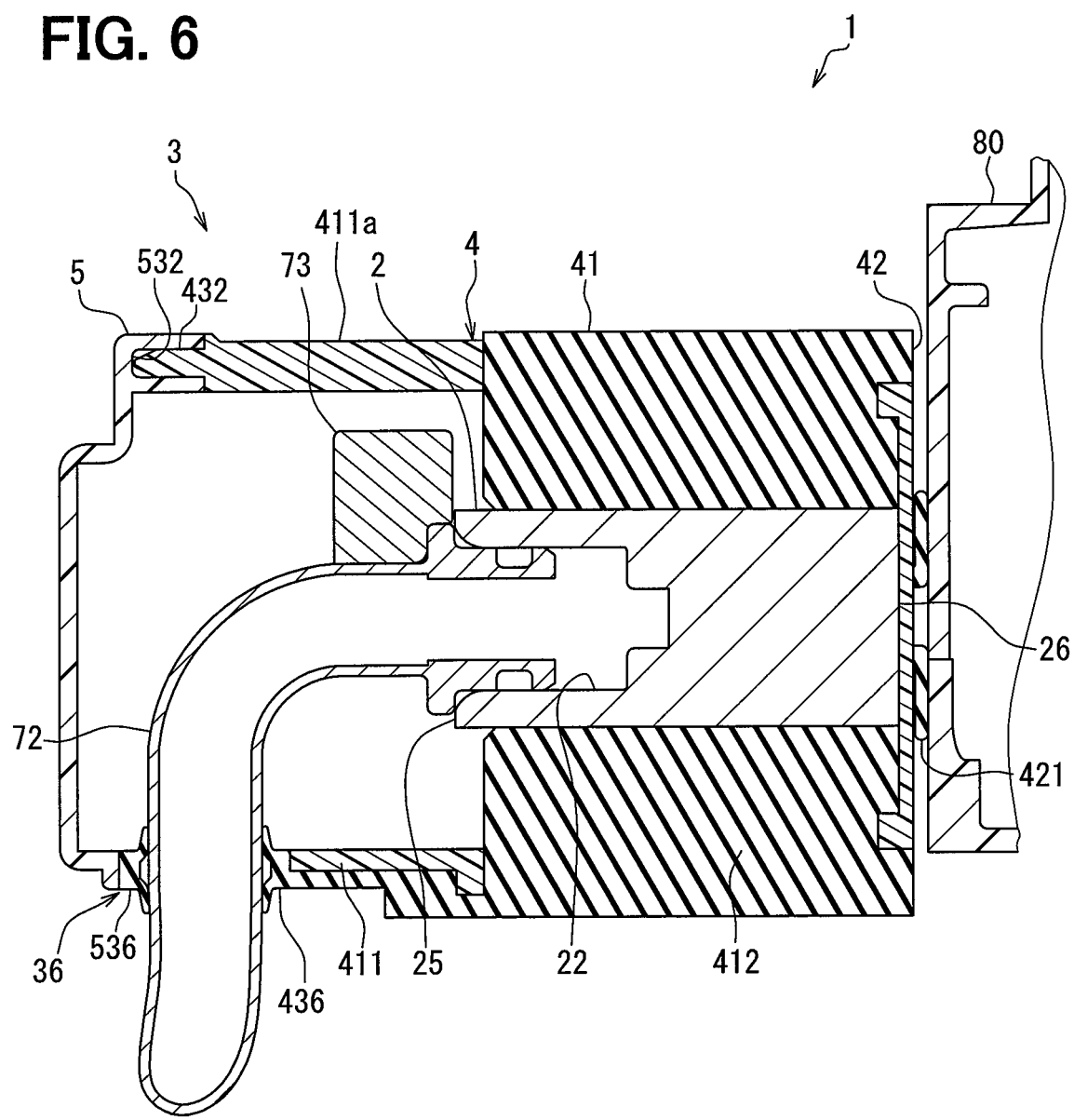
FIG. 6 is a cross-sectional view taken along a line VI-VI of FIG. 3.

The casing 3 has a high pressure pipe seal portion 36 where the high pressure pipe 72 is interposed between the end of the cover portion 5 and the end of the housing portion 4 for sealing. The high pressure pipe seal portion 36 is formed of a soft material. As shown in FIG. 6, similar to the low pressure pipe seal portion 35, the high pressure pipe seal portion 36 has a contact end portion 536 adjacent to the cover portion 5 formed in a semicircular shape, and a contact end portion 436 adjacent to the housing portion 4 formed in a semicircular shape. The contact end portion 436 on the housing portion 4 is formed such that the elastic holding portion 412 continuously extends to the opening 410 while the elastic holding portion 412 covers a part of the tube part 411a of the support portion 411. The contact end portion 536 on the cover portion 5 is formed integrally with a soft material by two-color molding relative to a portion of the cover portion 5 made of a hard material. Like the low pressure pipe seal portion 35, the contact end portions 436, 536 form a circular opening by fitting the cover portion 5 and the housing portion 4. The inner diameter of this opening is formed smaller than the outer shape of the high pressure pipe 72. The high pressure pipe seal portion 36 has, for example, U-shape which is bifurcated toward the distal end. The bifurcated distal end of the high pressure pipe seal portion 36 contacts the outer peripheral surface of the high pressure pipe 72 and is elastically deformed. The high pressure pipe seal portion 36 seals the gap between the casing 3 and the high pressure pipe 72 by this elastic deformation.

The hermeticity of the casing 3 is enhanced by the groove 532 of the cover portion 5, the protrusion 432 of the housing portion 4, the seal portion 421 adjacent to the evaporator 8, the low pressure pipe seal portion 35, and the high pressure pipe seal portion 36. As a result, it is possible to further suppress the entry of air from the outside of the casing 3. If the air can easily enter the casing 3 from the outside, water vapor contained in the air intrudes between the casing 3 and the expansion valve body 2, causing dew condensation on the expansion valve body 2. When the casing 3 has high sealing property with respect to the outside, air containing water vapor does not enter from the outside. Therefore, the water vapor condensed on the expansion valve body 2 is only the water vapor contained in the air sealed inside the casing 3. Thus, it is possible to suppress the amount of condensed moisture.

Next, a method of attaching the expansion valve device 1 to the air conditioning unit will be described. The evaporator connection surface 26 of the expansion valve body 2 housed in the housing portion 4 is connected to the joint portion 81. The low pressure pipe 71 and the high pressure pipe 72 gathered by the connection block 73 are connected to the pipe connection surface 25 from the opening 410. Thereafter, a bolt is inserted through the connection block 73, the expansion valve body 2 and the joint portion 81 to fix. As a result, the expansion valve body 2 is fixed to the evaporator 8, and the expansion valve body 2 is assembled to the air conditioning case 80. Thus, the pipes 71, 72 are fixed and assembled to the expansion valve body 2. At this time, the bottom portion 42 of the housing portion 4 is interposed between the expansion valve body 2 and the air conditioning case 80. That is, since the opening 410 is formed adjacent to the pipe connection surface 25, the bottom portion 42 of the housing portion 4 can be interposed between the expansion valve body 2 and the air conditioning case 80. Thereby, the tight contact between the seal portion 421 formed on the bottom portion 42 and the air conditioning case 80 is enhanced.

Thereafter, the cover portion 5 is attached to the housing portion 4. That is, the positioning portion 531 of the cover portion 5 is inserted into the positioning hole portion 431 of the housing portion 4, and the engaging portion of the cover portion 5 is engaged with the projecting portion 430 of the housing portion 4. At this time, the groove 532 of the cover portion 5 and the protrusion 432 of the housing portion 4 can be reliably fitted by the positioning portion 531 and the positioning hole portion 431. As a result, the internal space inside the casing 3 is hermetically sealed, to block entry of air into the internal space.

Next, the operation and effect of the expansion valve device 1 of the first embodiment will be described. The expansion valve device 1 is provided outside the air conditioning case 80 that houses the evaporator 8 for a vehicle air conditioner, and is connected to the pipe through which refrigerant passes from or to the evaporator 8. The expansion valve device 1 includes the expansion valve body 2 for depressurizing the refrigerant and the casing 3 for housing the expansion valve body 2. The casing 3 has the tube portion 41 formed integrally over the entire perimeter surrounding the expansion valve body 2, and has the opening 410 through which the expansion valve body 2 can pass. The tube portion 41 has the elastic holding portion 412 formed of an elastic material and surrounding the entire periphery of the expansion valve body 2 to hold the expansion valve body 2 with a reaction force due to elastic deformation. Further, the tube portion 41 has the support portion 411 formed of a material having higher rigidity than the elastic holding portion 412, and at least a part of the support portion is exposed to the outside of the casing 3.

Accordingly, the casing 3 holds the expansion valve body 2 by the elastic holding portion 412 without supporting the pipes 71, 72. Therefore, the pipes 71, 72 can be connected in a state where the expansion valve body 2 is housed in the casing 3. Further, the casing 3 holds the expansion valve body 2 by the elastic holding portion 412 of the tube portion 41 integrally formed. Therefore, it is possible to assemble the expansion valve device 1 in a state where the elastic holding portion 412 and the expansion valve body 2 are sufficiently in close contact with each other. Furthermore, since the rigid part of the support portion 411 exposed to the outside can be held at the assembling time, the assembling can be stably performed. As described above, it is possible to provide the expansion valve device 1 capable of improving the assembling property.

The casing 3 is a two-color molded product formed of the elastic holding portion 412 and the support portion 411. Accordingly, the casing 3 can be provided as an integrally formed product in which the elastic holding portion 412 and the support portion 411 are integrally formed. Therefore, an increase in the number of components can be suppressed.

The casing 3 has the seal portion 421 in close contact with the air conditioning case 80 to surround the entire perimeter of the joint portion 81 of the evaporator 8 connected with the expansion valve body 2. Accordingly, the gap between the casing 3 and the air conditioning case 80 can be sealed. Therefore, it is possible to suppress air from flowing into the casing 3 from the gap. Since the seal portion 421 is formed integrally with the casing 3, there is no need to newly attach a seal member for sealing between the air conditioning case 80 and the expansion valve device 1. Therefore, it is possible to suppress the number of components and the number of working steps.

The casing 3 further includes the cover portion 5 that closes the opening 410. Accordingly, since the opening 410 is closed by the cover portion 5 of the casing 3, air can be prevented from entering through the opening 410. Therefore, in the expansion valve device 1 having the casing 3 entirely installed in the vehicle cabin, the dew condensation can be suppressed more reliably.

The cover portion 5 has the low pressure pipe seal portion 35 and the high pressure pipe seal portion 36 for tightly sealing the space between the pipe and the end of the tube portion 41. Accordingly, it is possible to seal the gap between the pipe 71, 72 and the casing 3. Therefore, entry of air into the casing 3 can be further suppressed. That is, it is possible to more reliably suppress the condensation on the expansion valve body 2. Further, since the space between the pipe 71, 72 and the casing 3 can be sealed merely by attaching the cover portion 5 to the housing portion 4, the number of components and the number of working steps can be suppressed.

Second Embodiment

Figure 10:
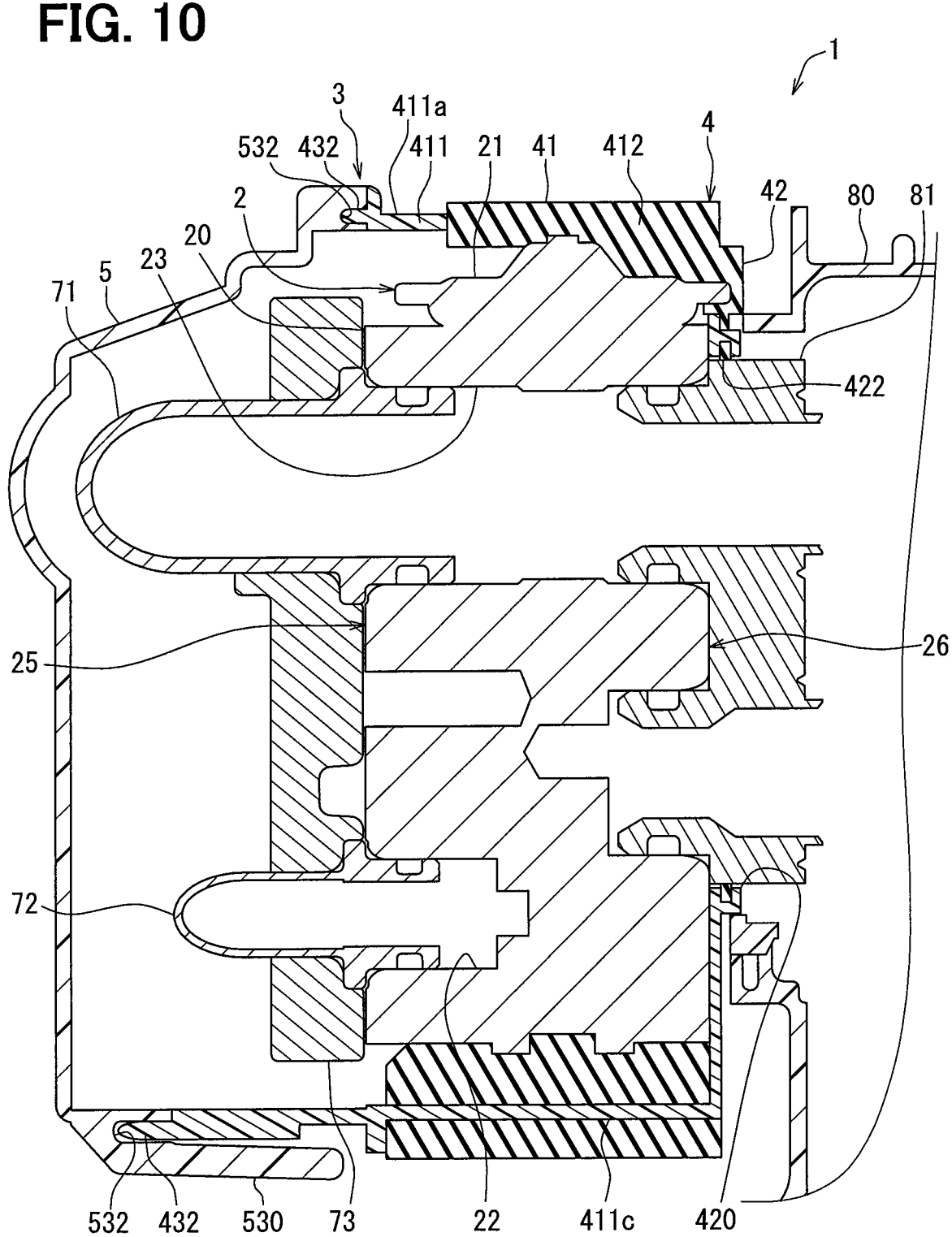
FIG. 10 is a cross-sectional view illustrating an expansion valve device according to a second embodiment.

The expansion valve device 1 of the second embodiment will be described with reference to FIG. 10. In the second embodiment, elements denoted by the same reference numerals as those in the drawings according to the first embodiment and configurations not described are the same as those of the first embodiment, and the same effects are exhibited. In the second embodiment, elements different from those in the first embodiment will be described.

The housing portion 4 has a joint seal portion 422 which is brought into close contact with the joint portion 81. The joint seal portion 422 corresponds to a connecting seal portion. The joint seal portion 422 is provided over the entire perimeter of the end portion of the bottom opening 420. The joint seal portion 422 is provided by a soft material integrally provided in two-color molding at the end of the bottom opening 420 made of a hard material. The joint seal portion 422 adheres to the entire perimeter of the joint portion 81 due to its elasticity. The joint seal portion 422 hermetically seals the gap between the bottom opening 420 and the joint portion 81 to restrain air from entering the casing 3. Therefore, when providing the joint seal portion 422, it is not necessary to provide the seal portion of the first embodiment. Alternatively, the casing 3 may have both the seal portion 421 and the joint seal portion 422 in order to further enhance the airtightness.

Next, the operation and effect of the expansion valve device 1 of the second embodiment will be described. The expansion valve device 1 of the second embodiment has the joint seal portion 422 which is in close contact with the joint portion 81 of the evaporator 8 connected with the expansion valve body 2. Accordingly, even when the position of the evaporator 8 is displaced with respect to the air conditioning case 80 due to vibration or the like, the seal position of the joint seal portion 422 with respect to the joint portion 81 is less affected by following to the displacement of the joint portion 81. That is, the joint seal portion 422 can seal the same position of the joint portion 81 at all times. Therefore, the sealing performance can be further enhanced. Therefore, it is possible to more reliably suppress external air from entering the casing 3 through the bottom opening 420.

Third Embodiment

The expansion valve device 1 of the third embodiment will be described with reference to FIGS. 11 and 12. In the third embodiment, elements denoted by the same reference numerals as those in the drawings according to the first embodiment and configurations not described are the same as those of the first embodiment, and the same effects are exhibited. In the third embodiment, elements different from those in the first embodiment will be described.

Figure 11:
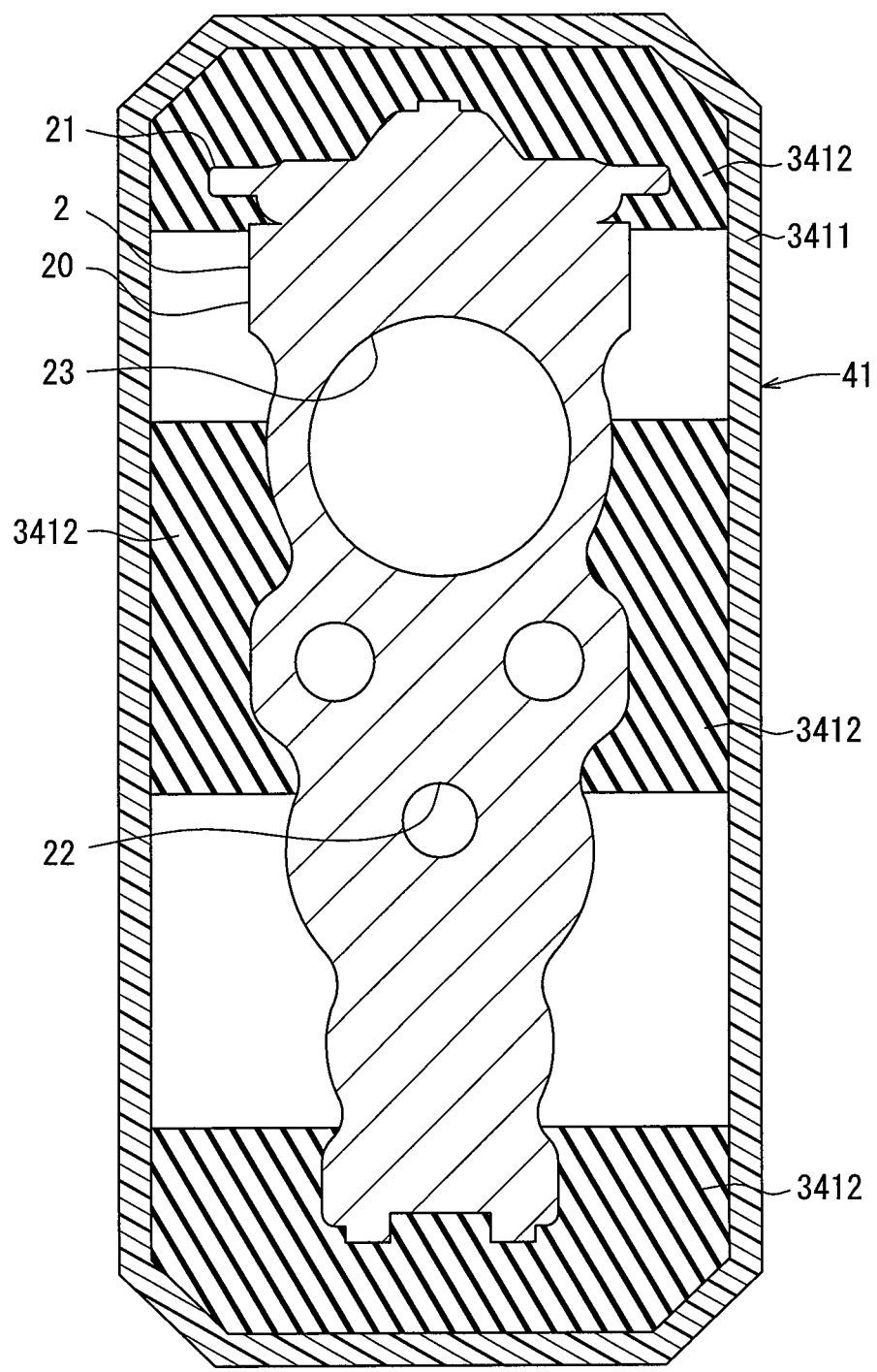
FIG. 11 is a cross-sectional view illustrating an expansion valve device according to a third embodiment.

As shown in FIG. 11, the tube portion 41 of the third embodiment has the elastic holding portion 3412 partially provided on the inner peripheral surface of the tube portion formed by the support portion 3411. The support portion 3411 has a tubular shape that surrounds the entire periphery of the expansion valve body 2. That is, the tube portion 41 of the third embodiment has a tubular appearance formed by only the tube portion of the support portion 3411 while the tube portion 41 of the first embodiment has a tubular appearance in which the tube part 411a of the support portion 411 and the tube part of the elastic holding portion 412 are coupled. The elastic holding portion 3412 is formed partly in the circumferential direction on the inner peripheral surface of the support portion 3411, and holds the expansion valve body 2 by a reaction force due to compression.

Figure 12:
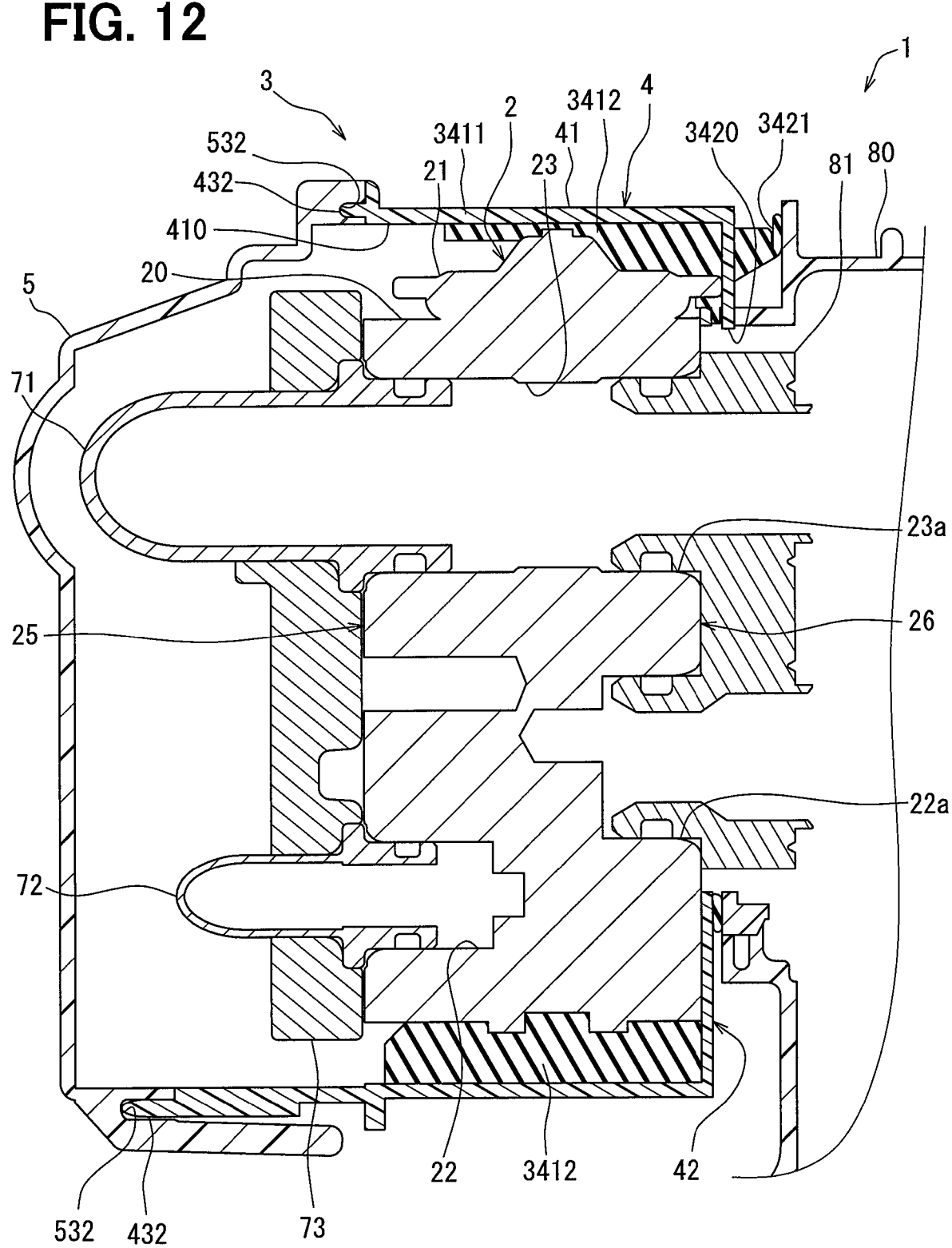
FIG. 12 is a cross-sectional view illustrating the expansion valve device of the third embodiment that is assembled to an air conditioning case.
Figure 13:
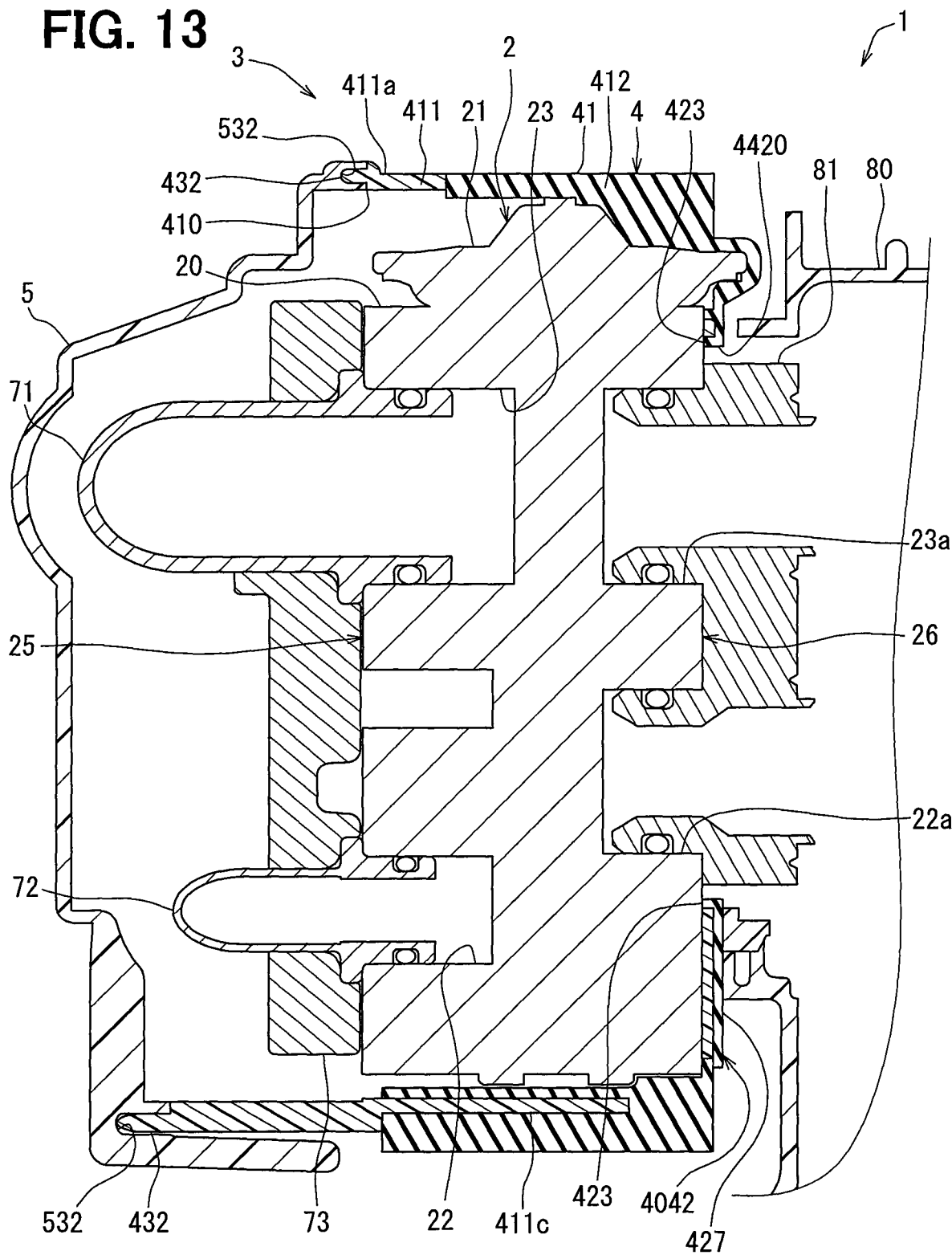
FIG. 13 is a cross-sectional view illustrating an expansion valve device according to a fourth embodiment.

As shown in FIG. 12, the housing portion 4 has the bottom portion 42 opposed to the evaporator connection surface 26 of the expansion valve body 2. The bottom portion 42 is formed by two-color molding, and integrally includes: a rigid part formed of a material continuous with the support portion 3411 of the tube portion 41, and a soft part formed of a material continuous with the elastic holding portion 3412. The bottom portion 42 has a bottom opening 3420 that exposes the outflow opening 22a and the inflow opening 23a of the evaporator connection surface 26 to the outside of the housing portion 4. A seal portion 3421 is formed on a surface of the bottom portion 42 adjacent to the air conditioning case 80.

The seal portion 3421 is formed of an elastic material such as rubber. The seal portion 3421 is made of the same material as, for example, the elastic holding portion 3412. The seal portion 3421 is formed by two-color molding integrally provided on a rigid part of the bottom portion 42. Alternatively, the seal portion 3421 may be provided continuous from the elastic holding portion 3412 of the tube portion 41. Like the seal portion 421 in the first embodiment, the seal portion 421 is provided to surround the entire periphery of the bottom opening 3420. When the expansion valve device 1 is attached to the air conditioning case 80, the seal portion 3421 is brought into close contact with the air conditioning case 80 over the entire perimeter. As a result, the seal portion 3421 prevents air from flowing between the outside and the inside of the casing 3 on the side of the bottom portion 42. Therefore, it is possible to prevent external air from flowing into the casing 3 through the bottom opening 3420.

The expansion valve device 1 of the third embodiment is provided outside the air conditioning case 80 that houses the evaporator 8 in the vehicle air conditioner, and is connected to the pipe through which refrigerant passes to or from the evaporator 8. The expansion valve device 1 includes the expansion valve body 2 for depressurizing the refrigerant and the casing 3 for housing the expansion valve body 2. The casing 3 has the tube portion 41 formed integrally over the entire perimeter surrounding the expansion valve body 2 and having the opening 410 through which the expansion valve body 2 can pass. The tube portion 41 has the elastic holding portion 3412 formed of an elastic material and surrounding the entire perimeter of the expansion valve body 2 to hold the expansion valve body 2 with a reaction force due to elastic deformation. Further, the tube portion 41 has the support portion 3411 formed of a material having higher rigidity than the elastic holding portion 3412, and at least a part of the support portion 3411 is exposed to the outside of the casing 3.

Accordingly, the casing 3 holds the expansion valve body 2 by the elastic holding portion 3412 without supporting the pipes 71, 72. Therefore, the pipes 71, 72 can be connected in a state where the expansion valve body 2 is housed in the casing 3. Further, the casing 3 holds the expansion valve body 2 by the elastic holding portion 3412 of the tube portion 41 integrally formed. Therefore, the elastic holding portion 3412 and the expansion valve body 2 can be assembled in a state where the elastic holding portion 3412 and the expansion valve body 2 are sufficiently in close contact with each other. Furthermore, since the rigid part of the support portion 3411 exposed to the outside can be held at the assembly time, the assembling can be stably performed. As described above, it is possible to provide the expansion valve device 1 capable of improving the assembling property.

Fourth Embodiment

The expansion valve device 1 of the fourth embodiment will be described with reference to FIGS. 13 to 17. In the fourth embodiment, elements denoted by the same reference numerals as those in the drawings according to the first embodiment and configurations not described are the same as those of the first embodiment, and the same effects are exhibited. In the following description, a direction in which the expansion valve body 2 housed in the expansion valve device 1 elongates is defined as a longitudinal direction. A direction perpendicular to the longitudinal direction and extending parallel to the evaporator connection surface 26 is referred to as a lateral direction.

The expansion valve device 1 of the fourth embodiment is different from that of the first embodiment in the configuration of the bottom portion 4042. An end seal portion 423 is formed on the bottom portion 4042. Further, a contact portion 427 in contact with the air conditioning case 80 is formed on the bottom portion 4042. The bottom portion 4042 corresponds to an opposing wall portion. The end seal portion 423 is a seal portion for restraining outside air of the expansion valve device 1 from flowing into the expansion valve device 1 via the bottom opening 4420. Further, the expansion valve body 2 of the fourth embodiment is different in shape from the first embodiment. That is, the body portion 20 of the expansion valve body 2 is shaped by connecting two rectangular parallelepipeds having different dimensions in the lateral direction. The dimension in the lateral direction is larger in the rectangular parallelepiped closer to the diaphragm portion 21.

Figure 14:
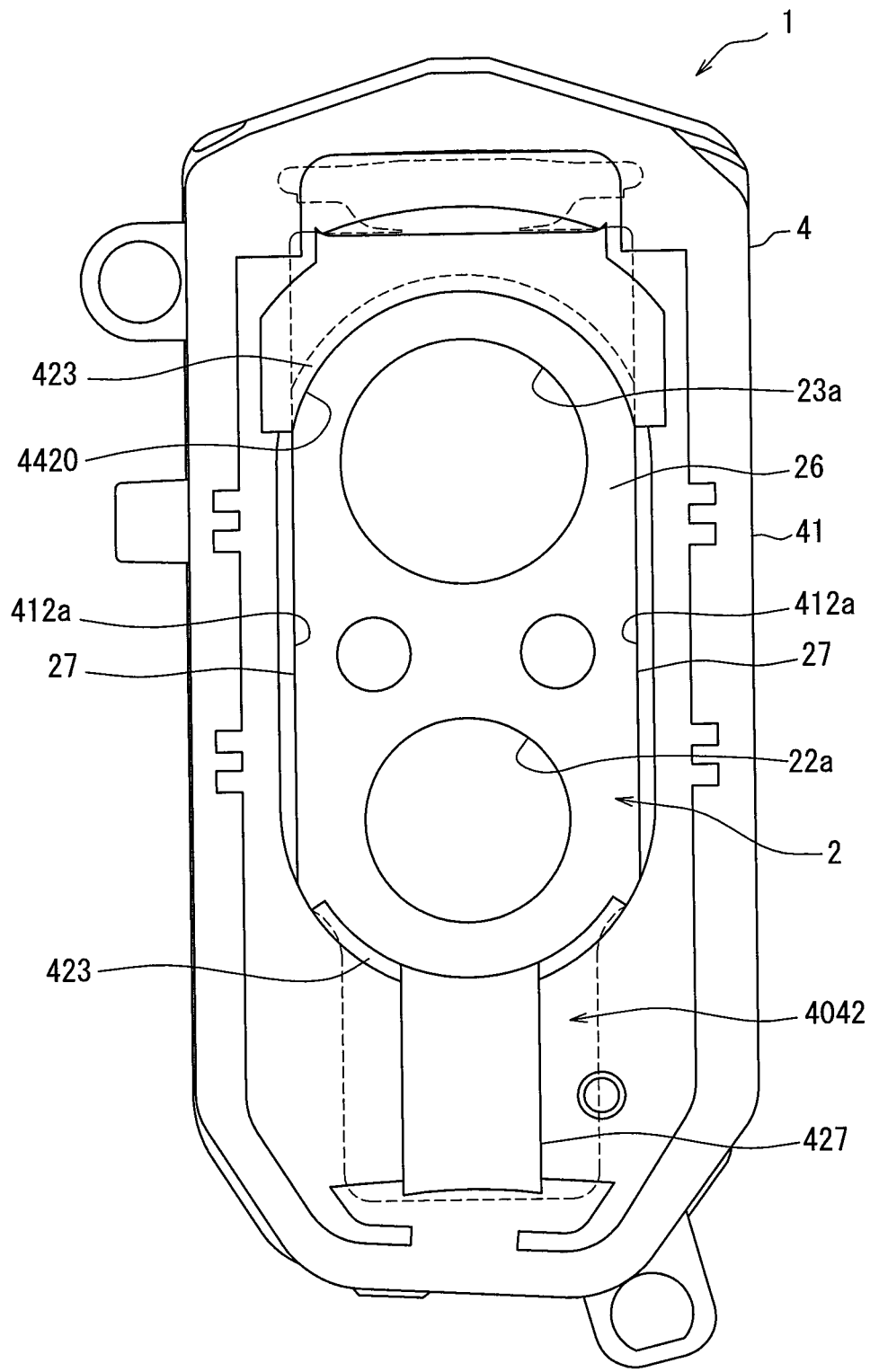
FIG. 14 is a plan view illustrating the expansion valve device of the fourth embodiment as viewed from a side of the air conditioning case.

As shown in FIG. 14, the bottom opening 4420 is formed to surround an outflow opening 22a through which the refrigerant flows into the evaporator 8 and an inflow opening 23a through which the refrigerant flows out of the evaporator 8 on the evaporator connection surface 26 of the expansion valve body 2. In other words, the region of the evaporator connection surface 26 including at least the outflow opening 22a and the inflow opening 23a is exposed to the outside from the bottom opening 4420. The bottom opening 4420 corresponds to a wall opening. The evaporator connection surface 26 corresponds to an end surface.

The evaporator connection surface 26 is exposed from the bottom opening 4420, for example, from an outer edge to another outer edge opposing to each other in the lateral direction. In addition, the vicinity of the respective openings 22a, 23a is exposed from the bottom opening 4420, across the outflow opening 22a and the inflow opening 23a in the longitudinal direction. A part of the bottom opening 4420 is formed by side portions on the bottom portion 4042 opposing to each other in the longitudinal direction. A part of the bottom opening 4420 is formed by a pair of wall portions 412a of the elastic holding portion 412 facing each other in the lateral direction across the expansion valve body 2. The bottom opening 4420 is formed in, for example, a rectangular rounded shape in a plan view viewed from a side of the air conditioning case 80.

The pair of wall portions 412a of the elastic holding portion 412 of the tube portion 41 faces and contacts the side surface 27 of the expansion valve body 2. The side surface 27 of the expansion valve body 2 intersects the evaporator connection surface 26. The side surface 27 is a surface of the body portion 20 connecting the pipe connection surface 25 and the evaporator connection surface 26.

The pair of wall portions 412a has a closing portion 412b that closes a gap between the side frame 411b and the expansion valve body 2. The closing portion 412b is provided, for example, at the end of the wall portion 412a adjacent to the bottom opening 4420. The closing portion 412b is a part of a recess formed in the tube portion 41, and the side frame 411b is a bottom surface of the recess. The closing portion 412b defines the recess at a location adjacent to the bottom opening 4420. The closing portion 412b prohibits a space between the side frame 411b and the expansion valve body 2 formed by this recess from penetrating to the bottom opening 4420.

Figure 17:
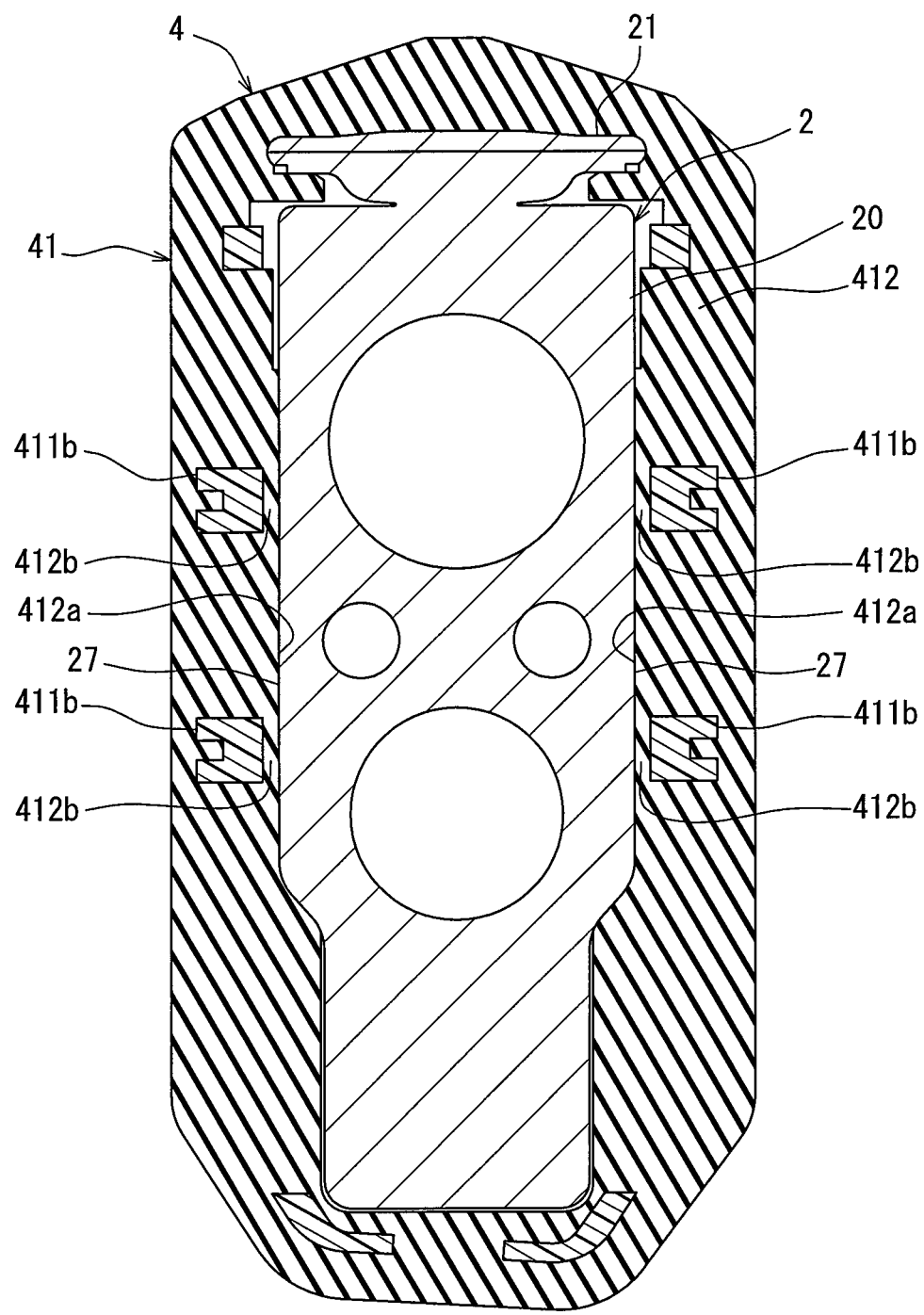
FIG. 17 is a cross-sectional view taken along a line XVII-XVII of FIG. 16.

Therefore, as shown in FIG. 17, the pair of wall portions 412a is in contact with the side surface of the expansion valve body 2 in an entire portion between a pair of end seal portions 423, at a location of the closing portion 412b in the direction from the pipe connection surface 25 to the evaporator connection surface 26. The closing portion 412b prevents air from entering the casing 3 through the gap between the side frame 411b and the expansion valve body 2 from the bottom opening 4420.

The end seal portion 423 is formed at a pair of edges that forms the bottom opening 4420 in the bottom portion 4042. The end seal portion 423 is formed on both sides of the bottom opening 4420 in the longitudinal direction. The end seal portion 423 is a seal lip protruding from the edge of the bottom opening 4420 into the casing 3. The end seal portion 423 is made of the same material as the elastic holding portion 412 such as rubber material, and has elasticity. The end seal portion 423 is formed by two-color molding integrally with a part of the bottom portion 4042 made of a resin material. The end seal portion 423 is formed continuously with a part of the bottom portion 4042 made of rubber material.

Figure 15:
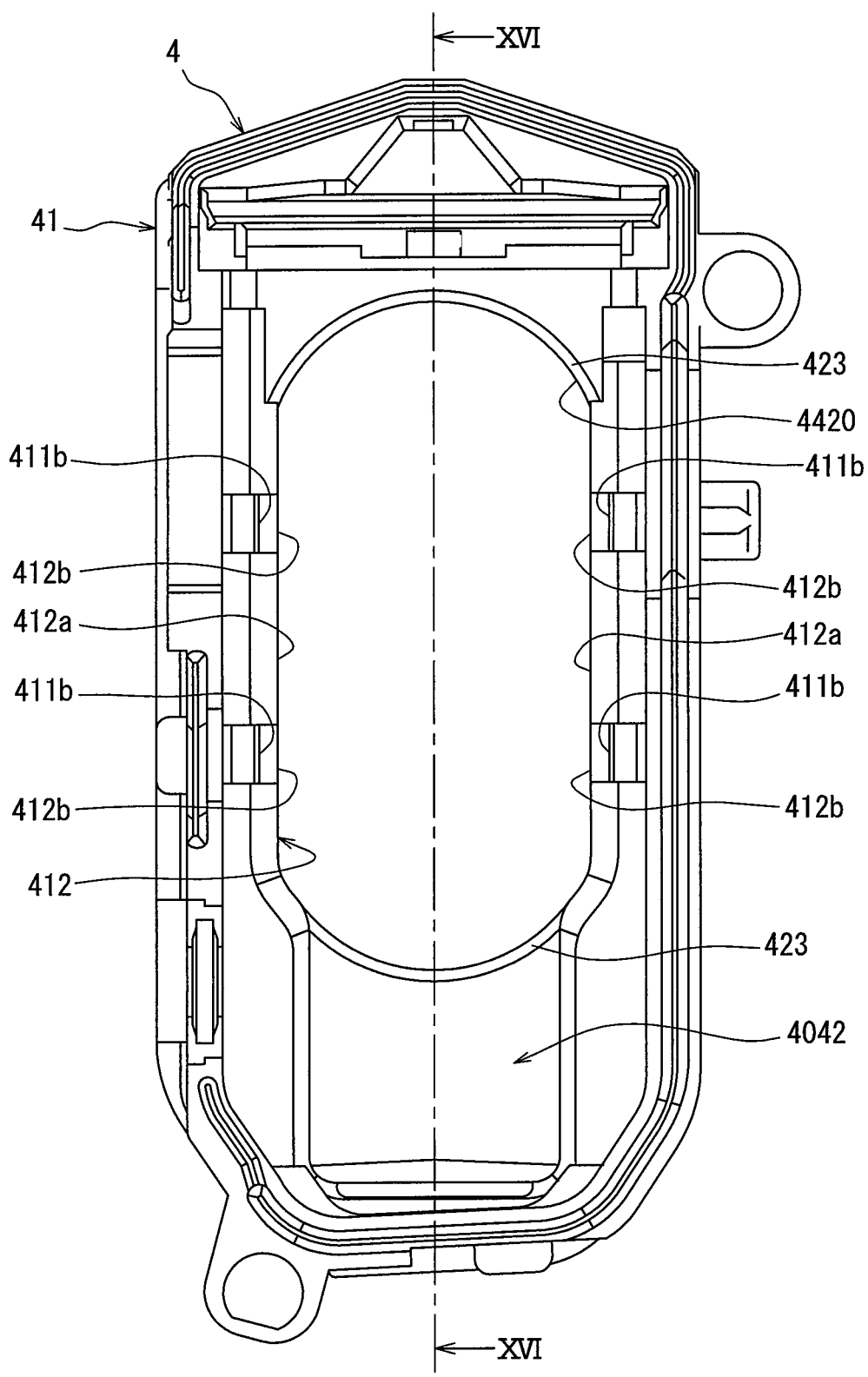
FIG. 15 is a view illustrating a casing of the expansion valve device of the fourth embodiment.
Figure 16:
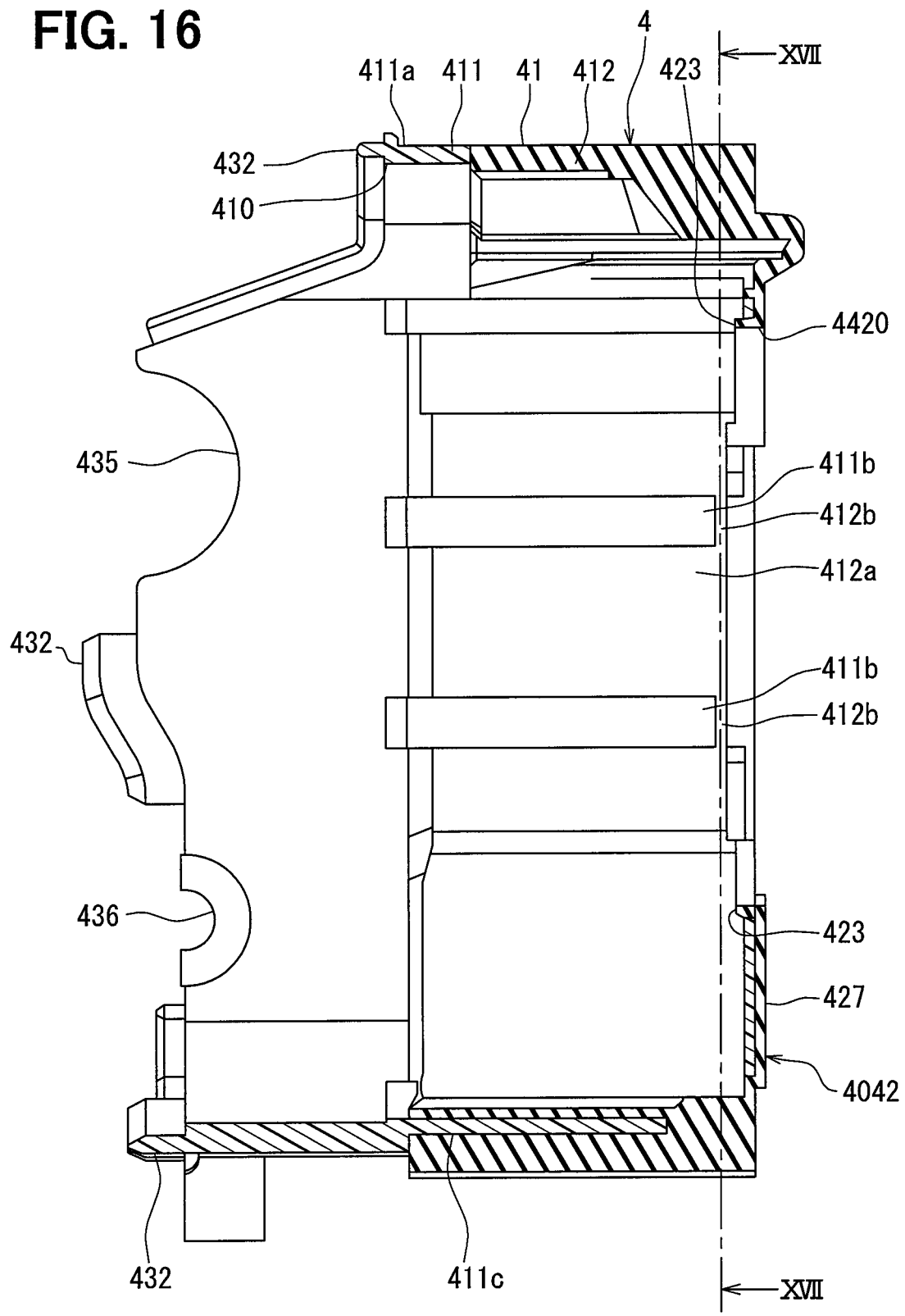
FIG. 16 is a cross-sectional view taken along a line XVI-XVI in FIG. 15.

The end seal portion 423 is in contact with the evaporator connection surface 26 of the expansion valve body 2. The end seal portion 423 is elastically deformed by contact with the evaporator connection surface 26, and is in close contact with the evaporator connection surface 26 to seal the gap between the bottom portion 4042 and the evaporator connection surface 26. The end seal portion 423 is formed in, for example, an arc shape so as not to interfere with the joint portion 81. As shown in FIGS. 15 and 16, the end seal portion 423 is formed continuous with both the wall portions 412a. In other words, the end seal portion 423 is formed of a material continuous with the elastic holding portion 412.

The bottom portion 4042 has the contact portion 427 in contact with the air conditioning case 80. The contact portion 427 is formed on the bottom portion 4042 opposing to the air conditioning case 80. The contact portion 427 is formed, for example, at the center of the bottom portion in the lateral direction. The contact portion 427 is formed continuously with the end seal portion 423. The contact portion 427 is formed to extend in the longitudinal direction from the edge of the bottom opening 4420. The contact portion 427 is an elastic portion formed to protrude more than its surroundings. When the expansion valve body is attached to the air conditioning case 80, the elastic portion is brought into contact with the air conditioning case 80 so as to be pressed against the air conditioning case 80. The contact portion 427 can suppress the transmission of vibrations between the air conditioning case 80 and the expansion valve device 1 due to its elasticity. It should be noted that the expansion valve device 1 may not have the contact portion 427, and may be connected to the joint portion 81 without contacting the air conditioning case 80.

Next, the operation and effect of the expansion valve device 1 of the fourth embodiment will be described. The casing 3 has the end seal portion 423 in contact with the evaporator connection surface 26 of the expansion valve body 2 to seal the gap between the bottom portion 4042 and the evaporator connection surface 26. Accordingly, the expansion valve device 1 can seal the gap between the bottom portion 4042 of the casing 3 and the evaporator connection surface 26 of the expansion valve body 2 by the end seal portion 423. That is, air can be prevented from flowing between the inside and the outside of the casing 3 through the bottom opening 4420. Therefore, it is possible to provide a sealing structure not depending on the shape of the external member such as the air conditioning case 80 or the joint portion 81. This makes it possible to improve the versatility of the expansion valve device 1.

The end seal portion 423 is formed continuous with the pair of wall portions 412a of the elastic holding portion 412 facing each other across the expansion valve body 2.

Accordingly, since the end seal portion 423 in contact with the evaporator connection surface 26 is continuous with the wall portion 412a of the elastic holding portion 412 in contact with the side surface 27 of the expansion valve body 2, the tightness between the expansion valve body 2 and the casing 3 can be enhanced.

Fifth Embodiment

Figure 18:
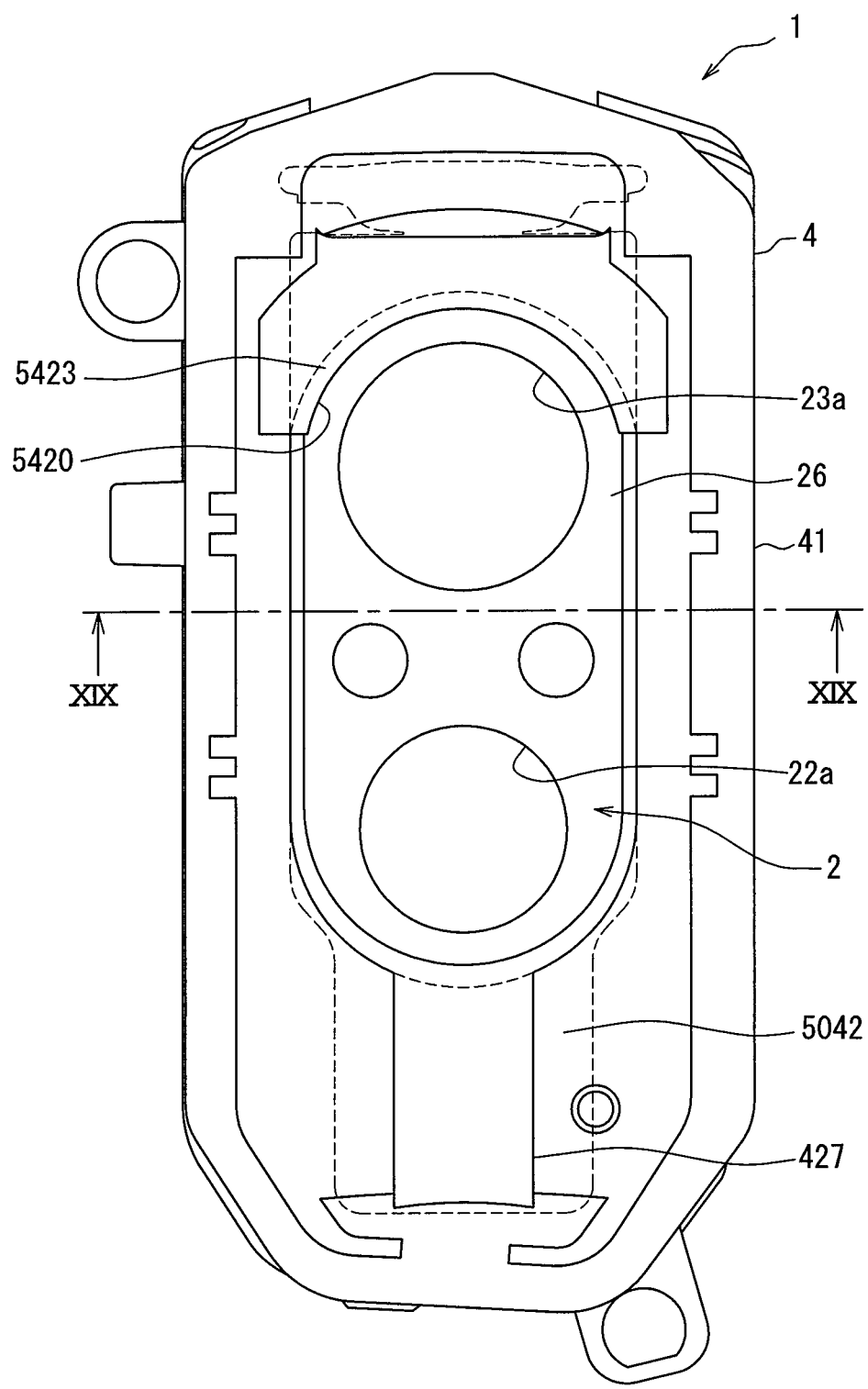
FIG. 18 is a plan view illustrating an expansion valve device according to a fifth embodiment as viewed from a side of the air conditioning case.
Figure 19:
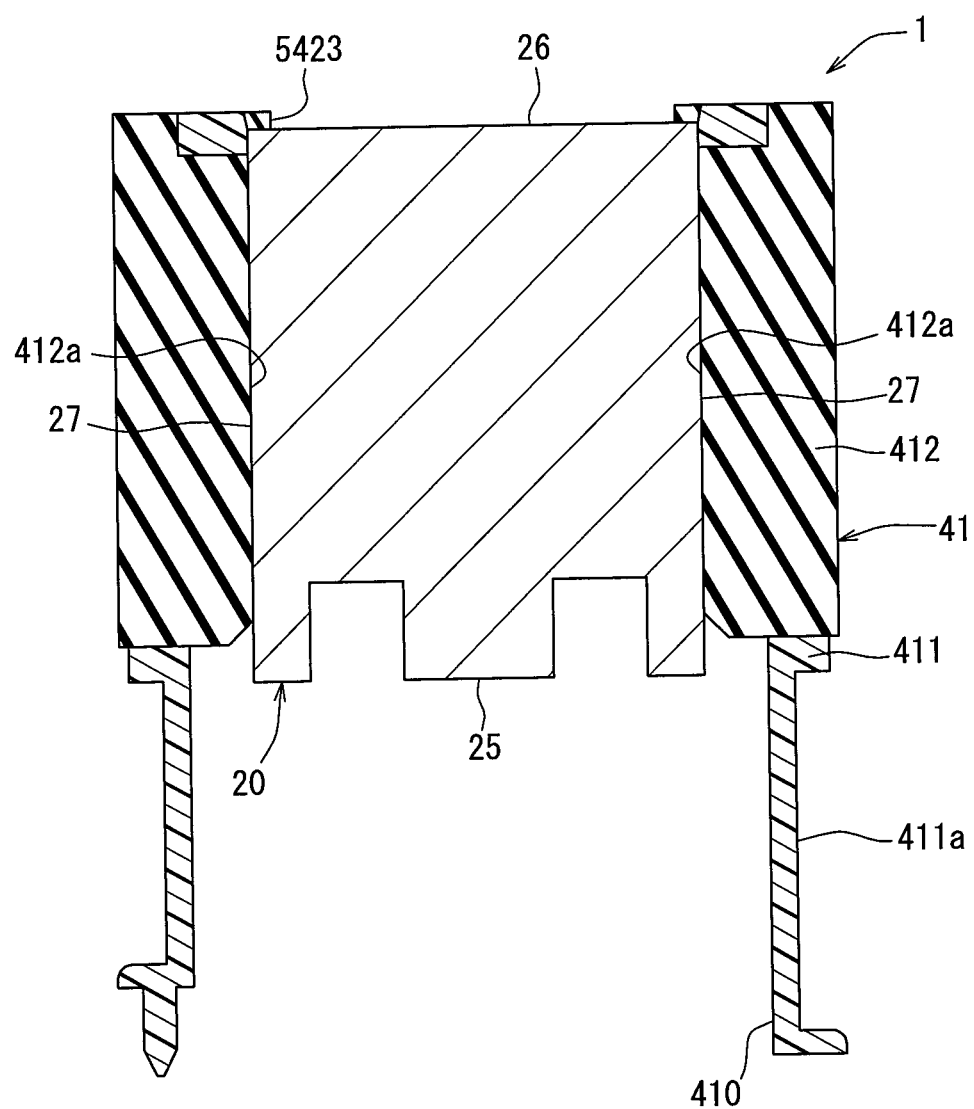
FIG. 19 is a cross-sectional view taken along a line XIX-XIX of FIG. 18.

The expansion valve device 1 of the fifth embodiment will be described with reference to FIGS. 18 and 19. In the fifth embodiment, elements denoted by the same reference numerals as those in the drawings according to the first embodiment and configurations not described are the same as those of the first embodiment, and the same effects are exhibited.

The expansion valve device 1 of the fifth embodiment has an end seal portion 5423 having a different structure from the end seal portion 423 of the fourth embodiment. As shown in FIG. 18, the end seal portion 5423 is provided to surround a region of the bottom portion 5042 exposed to the outside of the casing 3 from the bottom opening 5420.

The end seal portion 5423 is, for example, a seal lip formed to border the entire perimeter of the peripheral edge of the bottom opening 5420. That is, as shown in FIG. 19, the end seal portion 5423 is in contact with the evaporator connection surface 26 of the expansion valve body 2 on both sides in the lateral direction. Even with this configuration, it is possible to seal the gap between the bottom portion 4042 and the evaporator connection surface 26 by the contact between the end seal portion 5423 and the expansion valve body 2. That is, it is possible to provide a seal structure that does not depend on the shape of an external member such as an air conditioning case or a joint portion.

Further, the end seal portion 5423 is formed to entirely surround the outflow opening 22a on the evaporator connection surface 26. Accordingly, it is possible to further reduce the area of the evaporator connection surface 26 exposed to the outside of the casing 3, since the end seal portion 5423 comes into contact with the evaporator connection surface 26 around the entire periphery surrounding the outflow opening 22a. As a result, it is possible to further improve the heat insulating property of the casing 3 with respect to the expansion valve body 2.

Sixth Embodiment

The expansion valve device 1 of the sixth embodiment will be described with reference to FIGS. 20 and 21. The expansion valve device 1 of the sixth embodiment is a modification of the third embodiment. In the sixth embodiment, elements denoted by the same reference numerals as those in the drawings according to the third embodiment and configurations not described are the same as those of the third embodiment, and the same effects are exhibited.

Figure 20:
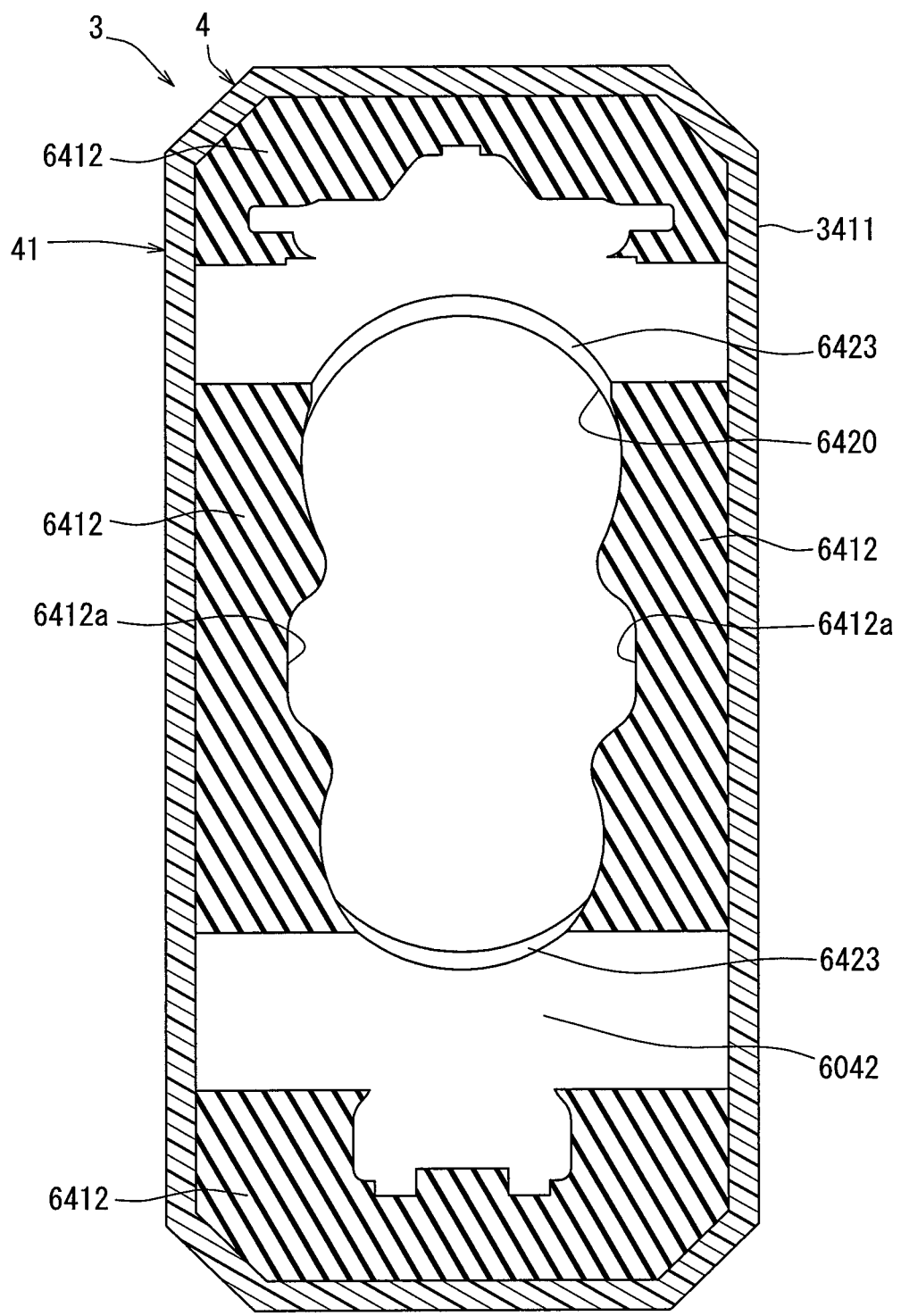
FIG. 20 is a view illustrating a casing according to a sixth embodiment.
Figure 21:
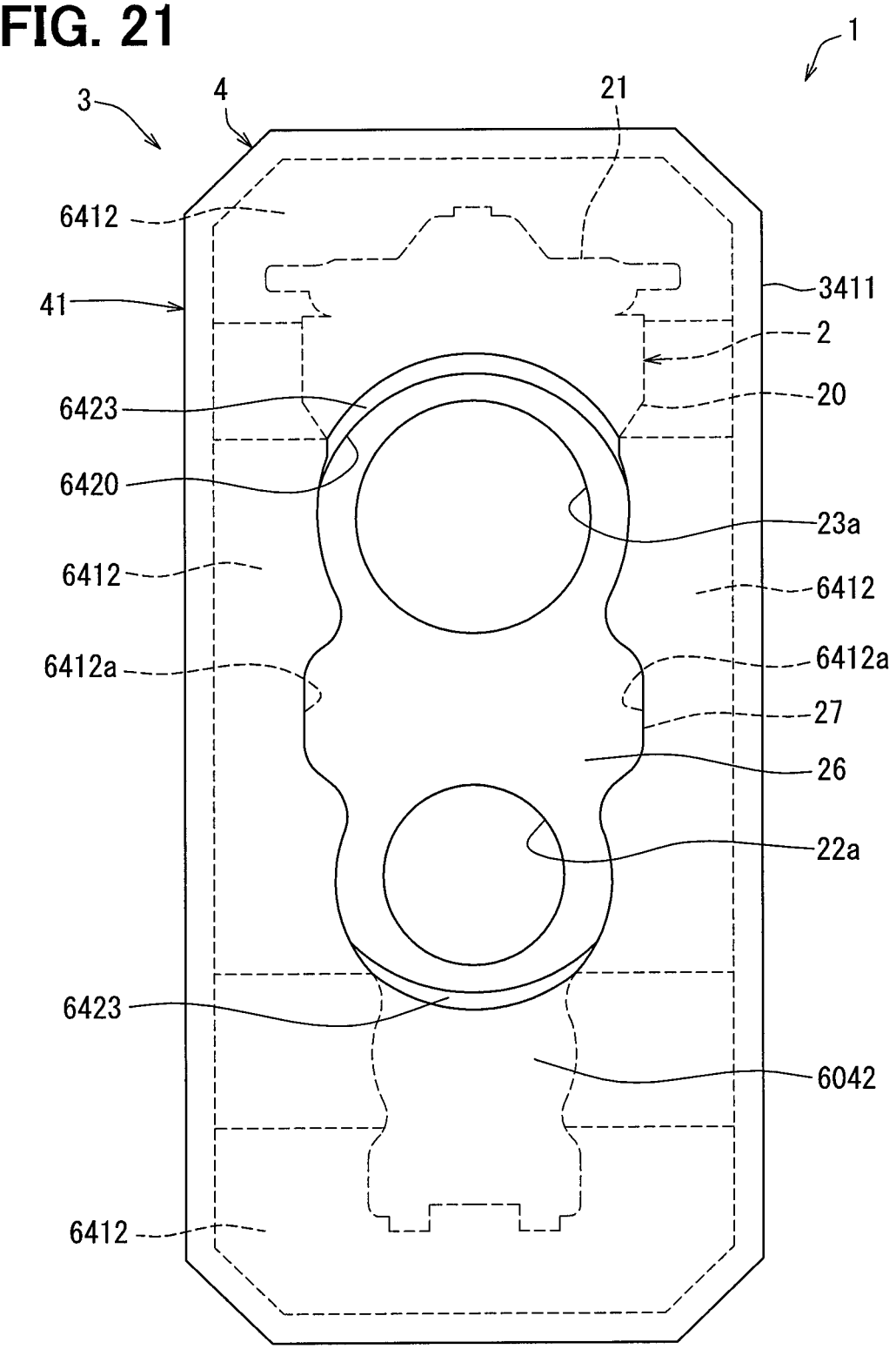
FIG. 21 is a plan view illustrating the expansion valve device of the sixth embodiment as viewed from a side of the air conditioning case.

As shown in FIGS. 20 and 21, the casing 3 has an end seal portion 6423. FIG. 20 is a cross-sectional view of the casing 3 from which the expansion valve body 2 is removed. FIG. 21 shows the expansion valve device 1 as viewed from a side of the bottom portion 6042. In the casing 3, the bottom opening 6420 is shaped by an elastic holding portion 6412 having a pair of wall portions 6412a to hold the side surface of the expansion valve body 2, and an end seal portion 6423 connecting the wall portions 6412a to each other. More specifically, of the plural elastic holding portions 6412 in the casing 3, a pair of elastic holding portions 6412 facing each other in the lateral direction has the pair of wall portions 6412a.

The end seal portion 6423 is continuous with the elastic holding portion 6412 on the both sides. In other words, the end seal portion 6423 is formed of a material continuous with the elastic holding portion 6412 on the both sides. When the expansion valve body 2 is housed in the casing 3, the space between the evaporator connection surface 26 of the expansion valve body and the bottom portion 6042 of the casing 3 is sealed by the end seal portion. The side surface 27 of the expansion valve body 2 is sealed by the close contact with the elastic holding portion 6412. This makes it possible to prevent air from flowing through the bottom opening 6420 into the casing 3. Even with this configuration, it is possible to provide a seal structure that does not depend on the shape of an external member such as an air conditioning case or a joint portion.

Seventh Embodiment

The expansion valve device 1 of the seventh embodiment will be described with reference to FIGS. 22 and 23. The expansion valve device 1 of the seventh embodiment is a modification of the sixth embodiment. In the seventh embodiment, elements denoted by the same reference numerals as those in the drawings according to the sixth embodiment and configurations not described are the same as those of the sixth embodiment, and the same effects are exhibited.

Figure 22:
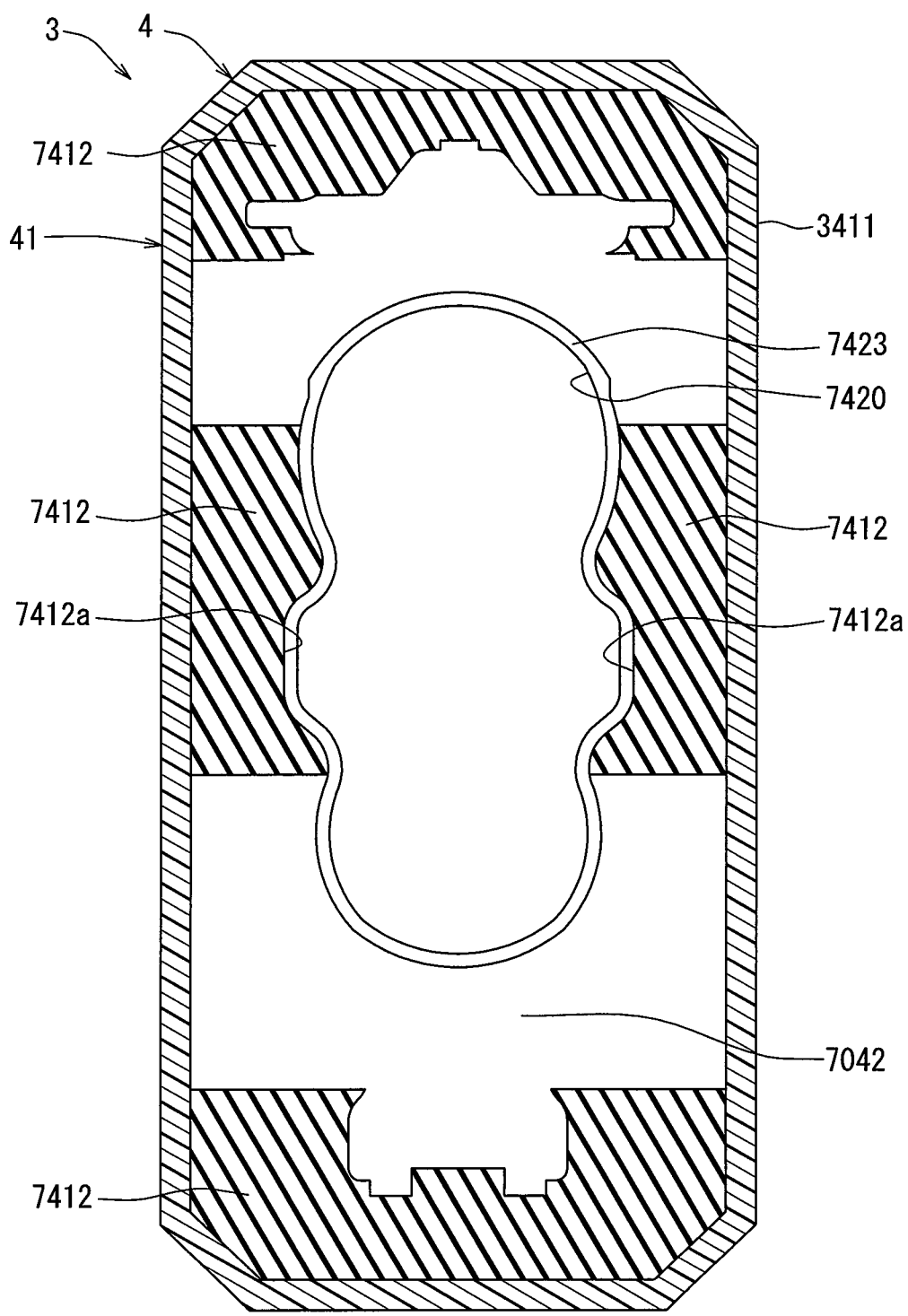
FIG. 22 is a view illustrating a casing according to a seventh embodiment.
Figure 23:
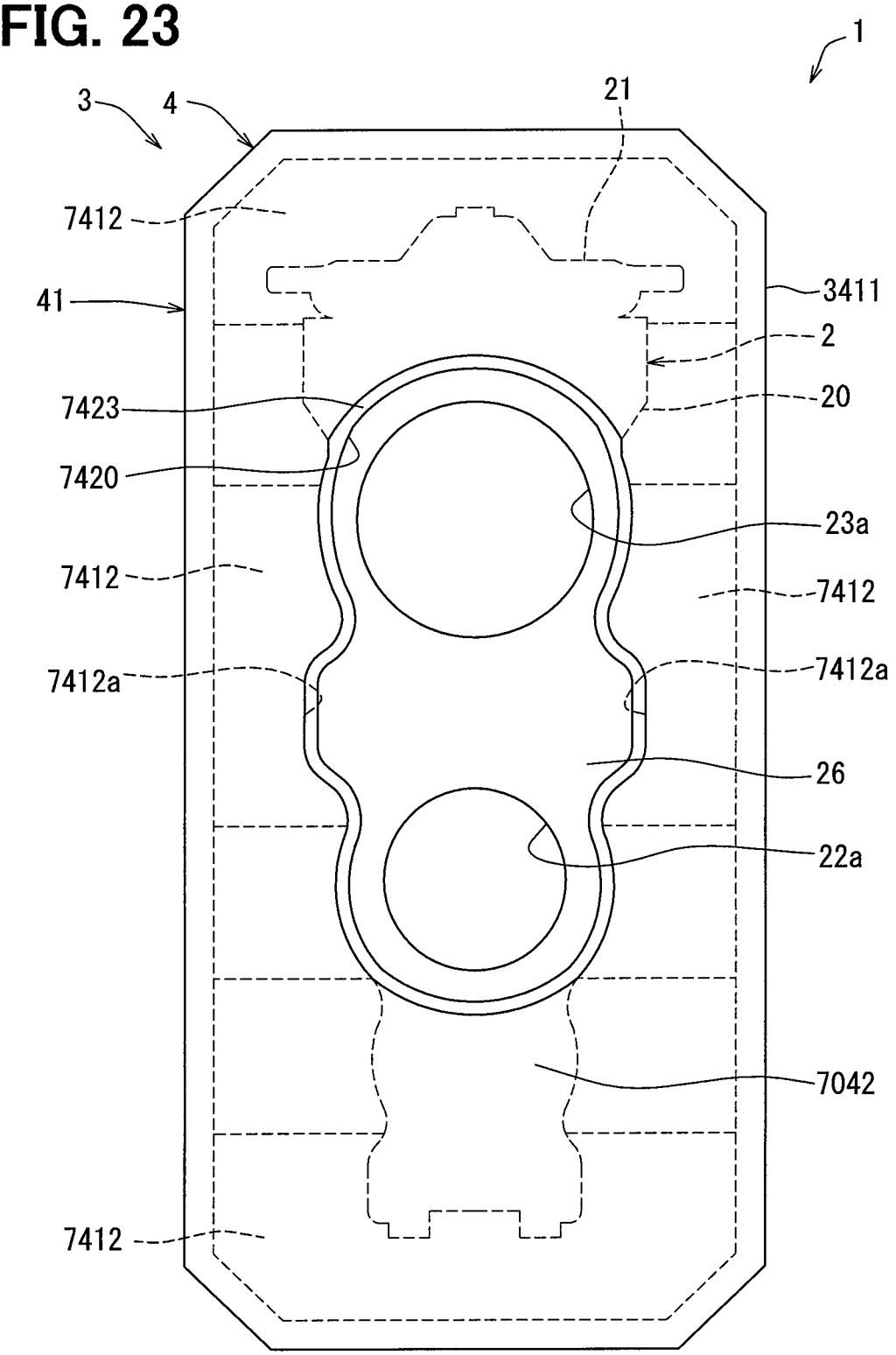
FIG. 23 is a plan view illustrating the expansion valve device of the seventh embodiment as viewed from a side of the air conditioning case.

As shown in FIGS. 22 and 23, the casing 3 has an end seal portion 7423 having a configuration different from the end seal portion 6423 of the sixth embodiment. FIG. 22 is a cross-sectional view of the casing 3 from which the expansion valve body 2 is removed. FIG. 23 shows the expansion valve device 1 as viewed from a side of the bottom portion 7042. The end seal portion 7423 is provided on the entire peripheral edge of the bottom opening 7420. The end seal portion 7423 is provided adjacent to a pair of elastic holding portions 7412 opposed to each other in the lateral direction, for example, of the plural elastic holding portions 7412.

The end seal portion 7423 is provided to surround the entire perimeter of a region of the evaporator connection surface 26 of the expansion valve body 2 exposed from the bottom opening 7420. The end seal portion 7423 surrounds the entire perimeter of the region including the outflow opening 22a and the inflow opening 23a on the evaporator connection surface 26. The end seal portion 7423 makes contact with the evaporator connection surface 26 of the expansion valve body 2 over its entire perimeter, and seals the gap between the bottom portion 7042 and the evaporator connection surface 26. Even with this configuration, it is possible to provide a seal structure that does not depend on the shape of an external member such as an air conditioning case or a joint portion.

Other Embodiments

The disclosure of this specification is not limited to the illustrated embodiment. The disclosure encompasses the illustrated embodiments and modifications by those skilled in the art based thereon. The present disclosure is not limited to combinations disclosed in the above-described embodiment but can be implemented in various modifications. The present disclosure can be implemented in various combinations. The disclosure may have additional parts that may be added to the embodiment. The disclosure encompasses omissions of parts and/or elements of the embodiments. The disclosure encompasses replacement or combination of parts and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

In the above embodiments, the elastic holding portion 412, 3412 and the support portion 411, 3411 are integrally formed by two-color molding, but may be formed separately. For example, the elastic holding portion may be a rubber packing provided on the inner surface of the support portion shaped in the tube. In the first embodiment, the support portion 411 and the elastic holding portion 412 may be separate members, and the side frame 411b and the lower frame 411c of the support portion 411 may not be connected to the bottom portion 42. In this case, for example, the support portion 411 is attached to the elastic holding portion 412 by inserting the side frame 411b and the lower frame 411c into the elastic holding portion 412.

In the above embodiments, the expansion valve device 1 is connected to the pipes 71, 72 extending into the vehicle cabin from the dash panel 15, and is provided in the vehicle cabin. However, the expansion valve device 1 may be provided between the dash panel 15 and the air conditioning case 80. For example, the expansion valve device 1 may be fitted in an opening formed in the dash panel 15, and the opening 410 of the expansion valve device 1 may be opened to the engine room. In this case, the internal space of the casing 3 is tightly sealed with respect to the vehicle cabin, and may not be sealed to the engine room. That is, in this configuration, the cover portion that closes the opening 410 can be omitted.

In the above embodiments, the expansion valve device 1 has the opening 410 provided adjacent to the pipe connection surface 25, but the opening may be provided adjacent to the evaporator connection surface 26. That is, the expansion valve body 2 may be housed in the housing portion 4 by inserting the pipe connection surface 25 firstly through the opening, of the connection surfaces 25, 26.

In the above embodiments, the expansion valve body 2 and the evaporator 8 are directly connected by the joint portion 81 of the evaporator 8. Alternatively, the evaporator 8 and the expansion valve body 2 may be indirectly connected by piping. In this case, the joint seal portion 422 in the second embodiment is in close contact with the outer peripheral surface of the pipe.

What is claimed is:

1. An expansion valve device provided outside an air conditioning case in which an evaporator is disposed in an air conditioner for a vehicle, to be connected to a pipe through which a refrigerant flows from or to the evaporator, the expansion valve device comprising:
    an expansion valve body that depressurizes the refrigerant; and
    a casing in which the expansion valve body is housed, wherein
    the casing includes a tube portion having an opening through which the expansion valve body is able to pass, the tube portion being integrally formed to surround over an entire perimeter of the expansion valve body, the tube portion has
    an elastic holding portion formed of an elastic material, the elastic holding portion extending in an axial direction of the tube portion and holding the expansion valve body by a reaction force due to elastic deformation by surrounding the entire perimeter of the expansion valve body, and
    a support portion formed of a material having a higher rigidity than the elastic holding portion and supporting the elastic holding portion, at least a part of the support portion being exposed to outside of the casing.

2. The expansion valve device according to claim 1, wherein
    the support portion has a plurality of side frames respectively extending in an extending direction of the tube portion on both sides of the expansion valve body, and
    the plurality of side frames are provided between the elastic holding portion and the expansion valve body.

3. The expansion valve device according to claim 1, wherein
    the support portion has a lower frame extending in an extending direction of the tube portion to cover a lower surface of the expansion valve body, and
    the lower frame is provided inside the elastic holding portion.

4. The expansion valve device according to claim 1, wherein
    the casing includes a seal portion to be in close contact with the air conditioning case, and
    the seal portion is provided to surround an entire perimeter of a connecting portion of the evaporator connected with the expansion valve body.

5. The expansion valve device according to claim 1, wherein
    the casing has a connecting seal portion to be in close contact with a connecting portion of the evaporator connected with the expansion valve body.

6. The expansion valve device according to claim 1, wherein
    the casing has
        an opposing wall portion opposed to an end surface of the expansion valve body having an outflow opening through which the refrigerant flows into the evaporator,
        a wall opening formed in the opposing wall portion to expose the outflow opening of the end surface to outside of the casing, and
        an end seal portion provided on the opposing wall portion and in contact with the end surface to seal a gap between the opposing wall portion and the end surface.

7. The expansion valve device according to claim 1, wherein
    the casing is a two-color molded product of the elastic holding portion and the support portion.

8. The expansion valve device according to claim 1, wherein
    the expansion valve body has a connection surface to which the pipe is connected, and
    the opening of the casing is located adjacent to the connection surface.

9. The expansion valve device according to claim 8, wherein
    the casing includes a cover portion to close the opening.

10. The expansion valve device according to claim 9, wherein
    the casing has a pipe seal portion in close contact with an outer peripheral surface of the pipe,
    the pipe seal portion has
        an end of the tube portion in close contact with the outer peripheral surface, and an end of the cover portion in close contact with the outer peripheral surface, and the pipe is interposed between the end of the tube portion and the end of the cover portion.

11. The expansion valve device according to claim 1, wherein the support portion is formed of a resin material, and the elastic holding portion is formed of a rubber material.

12. The expansion valve device according to claim 1, wherein the expansion valve body has a diaphragm portion, and a body portion including an inflow passage through which the refrigerant flows into the evaporator, and an outflow passage through which the refrigerant flows out of the evaporator, and the elastic holding portion holds at least a portion of the diaphragm portion and the body portion surrounding the outflow passage.

13. An expansion valve device provided outside an air conditioning case in which an evaporator is disposed in an air conditioner for a vehicle, to be connected to a pipe through which a refrigerant flows from or to the evaporator, the expansion valve device comprising:

an expansion valve body that depressurizes the refrigerant; and a casing in which the expansion valve body is housed, wherein the casing includes a tube portion having an opening through which the expansion valve body is able to pass, the tube portion being integrally formed to surround over an entire perimeter of the expansion valve body, the tube portion has an elastic holding portion formed of an elastic material and holding the expansion valve body by a reaction force due to elastic deformation by surrounding the entire perimeter of the expansion valve body, a support portion formed of a material having a higher rigidity than the elastic holding portion and supporting the elastic holding portion, at least a part of the support portion being exposed to outside of the casing, the support portion has a plurality of side frames respectively extending in an extending direction of the tube portion on both sides of the expansion valve body, and the plurality of side frames are provided between the elastic holding portion and the expansion valve body.

14. An expansion valve device provided outside an air conditioning case in which an evaporator is disposed in an air conditioner for a vehicle, to be connected to a pipe through which a refrigerant flows from or to the evaporator, the expansion valve device comprising:

an expansion valve body that depressurizes the refrigerant; and a casing in which the expansion valve body is housed, wherein the casing includes a tube portion having an opening through which the expansion valve body is able to pass, the tube portion being integrally formed to surround over an entire perimeter of the expansion valve body, the tube portion has an elastic holding portion formed of an elastic material and holding the expansion valve body by a reaction force due to elastic deformation by surrounding the entire perimeter of the expansion valve body, a support portion formed of a material having a higher rigidity than the elastic holding portion and supporting the elastic holding portion, at least a part of the support portion being exposed to outside of the casing, the support portion has a lower frame extending in an extending direction of the tube portion to cover a lower surface of the expansion valve body, and the lower frame is provided inside the elastic holding portion.

15. An expansion valve device provided outside an air conditioning case in which an evaporator is disposed in an air conditioner for a vehicle, to be connected to a pipe through which a refrigerant flows from or to the evaporator, the expansion valve device comprising:

an expansion valve body that depressurizes the refrigerant; and a casing in which the expansion valve body is housed, wherein the casing includes a tube portion having an opening through which the expansion valve body is able to pass, the tube portion being integrally formed to surround over an entire perimeter of the expansion valve body, the tube portion has an elastic holding portion formed of an elastic material and holding the expansion valve body by a reaction force due to elastic deformation by surrounding the entire perimeter of the expansion valve body, a support portion formed of a material having a higher rigidity than the elastic holding portion and supporting the elastic holding portion, at least a part of the support portion being exposed to outside of the casing, the casing has an opposing wall portion opposed to an end surface of the expansion valve body having an outflow opening through which the refrigerant flows into the evaporator, a wall opening formed in the opposing wall portion to expose the outflow opening of the end surface to outside of the casing, and an end seal portion provided on the opposing wall portion and in contact with the end surface to seal a gap between the opposing wall portion and the end surface.

16. The expansion valve device according to claim 15, wherein the end seal portion is continuous with a pair of wall portions of the elastic holding portion opposing to each other across the expansion valve body.

17. The expansion valve device according to claim 15, wherein the end seal portion surrounds the outflow opening of the end surface to seal the gap between the opposing wall portion and the end surface.

18. An expansion valve device provided outside an air conditioning case in which an evaporator is disposed in an air conditioner for a vehicle, to be connected to a pipe through which a refrigerant flows from or to the evaporator, the expansion valve device comprising:

an expansion valve body that depressurizes the refrigerant; and a casing in which the expansion valve body is housed, wherein the casing includes:

a tube portion having an opening through which the expansion valve body is able to pass, the tube portion being integrally formed to surround over an entire perimeter of the expansion valve body, and a seal portion that blocks air from flowing between inside and outside of the casing at a portion connected to the evaporator, the tube portion has an elastic holding portion formed of an elastic material and holding the expansion valve body by a reaction force due to elastic deformation, and a support portion formed of a material having a higher rigidity than the elastic holding portion to surround the entire periphery of the expansion valve body and supporting the elastic holding portion, at least a part of the support portion being exposed to outside of the casing, the casing has an opposing wall portion opposed to an end surface of the expansion valve body having an outflow opening through which the refrigerant flows into the evaporator, and a wall opening formed in the opposing wall portion to expose a region of the end surface including the outflow opening to outside of the casing, and the seal portion includes an end seal portion provided on the opposing wall portion and in contact with the end surface to seal a gap between the opposing wall portion and the end surface.

19. The expansion valve device according to claim 18, wherein the end seal portion is continuous with a pair of wall portions of the elastic holding portion opposing each other across the expansion valve body.

20. The expansion valve device according to claim 18, wherein the end seal portion is formed to surround the outflow opening of the end surface.

* * * * *